US006582782B2

(12) United States Patent
Heckmeier et al.

(10) Patent No.: US 6,582,782 B2
(45) Date of Patent: Jun. 24, 2003

(54) ELECTRO-OPTICAL LIQUID CRYSTAL DISPLAY

(75) Inventors: Michael Heckmeier, Bensheim (DE); Brigitte Schuler, Haibach (DE); Achim Goetz, Alsbach-Haehnlein (DE); Matthias Bremer, Darmstadt (DE)

(73) Assignee: Merck Patent Gesellschaft, Darmstadt (DE)

( * ) Notice: Subject to any disclaimer, the term of this patent is extended or adjusted under 35 U.S.C. 154(b) by 35 days.

(21) Appl. No.: 09/827,342

(22) Filed: Apr. 6, 2001

(65) Prior Publication Data

US 2002/0031619 A1 Mar. 14, 2002

(30) Foreign Application Priority Data

Apr. 7, 2000 (DE) ........................................ 100 17 385

(51) Int. Cl.$^7$ ........................ C09K 19/34; C09K 19/30; C09K 19/12; C09K 19/20

(52) U.S. Cl. .............. 428/1.1; 252/299.61; 252/299.63; 252/299.64; 252/299.66; 252/299.67

(58) Field of Search ...................... 428/1.1; 252/299.63, 252/299.61, 299.01, 299.64, 299.66, 299.67

(56) References Cited

U.S. PATENT DOCUMENTS 5,454,975 A * 10/1995 Reiffenrath et al. .... 252/299.61

FOREIGN PATENT DOCUMENTS

DE 4410606 * 10/1994
DE 10004636 * 8/2000

OTHER PUBLICATIONS

Reiffenrath Volker et al., Abstract of DE 44 10606, published Oct. 6, 1994.

* cited by examiner

*Primary Examiner*—Shean C. Wu
(74) *Attorney, Agent, or Firm*—Millen, White, Zelano & Branigan, P.C.

(57) ABSTRACT

The invention relates to an electro-optical liquid-crystal display having a realignment layer for realignment of the liquid crystals whose field has a component, which is crucial for the realignment, parallel to the liquid-crystal layer, containing a liquid-crystalline medium of positive dielectric anisotropy, where the medium comprises at least one mesogenic compound of the formula I:

I

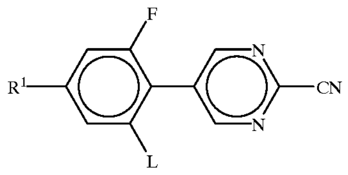

in which $R^1$ and L are defined herein.

23 Claims, No Drawings

ELECTRO-OPTICAL LIQUID CRYSTAL DISPLAY

The invention relates to an electro-optical liquid-crystal display having a realignment layer for realignment of the liquid crystals whose field has a component, which aids the realignment, parallel to the liquid-crystal layer, containing a liquid-crystalline medium of positive dielectric anisotropy, where the medium comprises at least one mesogenic compound of the formula I:

I

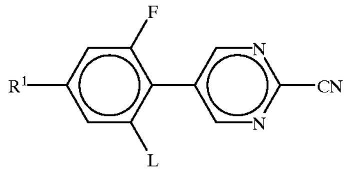

in which $R^1$ is alkyl or alkoxy having 1 to 7 carbon atoms or alkenyl, alkenyloxy or alkoxyalkyl having 2 to 7 carbon atoms, and L is H or F.

In conventional liquid-crystal displays (TN, STN, OMI or AMD-TN), the electric fields for realignment are generated essentially perpendicular to the liquid-crystal layer.

International Patent Application WO 91/10936 discloses a liquid-crystal display in which the electric signals are generated in such a way that the electric fields have a significant component parallel to the liquid-crystal layer (IPS, in-plane switching). The principles of operating a display of this type are described, for example, by R. A. Soref in Journal of Applied Physics, Vol. 45, No.12, pp. 5466–5468 (1974).

EP 0 588 568, for example, discloses various possibilities for the design of the electrodes and for addressing a display of this type. DE 198 24 137 likewise describes various embodiments of IPS displays of this type.

Liquid-crystalline materials for IPS displays of this type are described, for example, in DE 195 28 104.

The IPS displays containing the known liquid-crystalline media are characterized by inadequate, long response times and often excessively high operating voltages. There is thus a demand for IPS displays which do not have these disadvantages or only do so to a reduced extent. To this end, liquid-crystalline materials are required which, besides an adequate phase range, low tendency towards crystallization at low temperatures, low birefringence and adequate electrical resistance, have, in particular, low threshold voltages ($V_{10}$) and low rotational viscosities ($\gamma_1$), which are crucial for the response times.

This feature has, surprisingly, been achieved by the use of liquid-crystalline materials which comprise at least one compound of the formula I.

The IPS mixtures according to the invention are distinguished by their relatively low rotational viscosity values and their low threshold voltage and response time values.

The invention thus relates to an electro-optical liquid-crystal display having a realignment layer for realignment of the liquid crystals whose field, desirably, has a significant component parallel to the liquid-crystal layer, containing a liquid-crystalline medium of positive dielectric anisotropy, where the medium comprises at least one compound of the formula I:

I

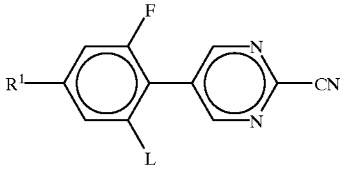

in which $R^1$ is alkyl or alkoxy having 1 to 7 carbon atoms or alkenyl, alkenyloxy or alkoxyalkyl having 2 to 7 carbon atoms, and L is H or F.

Particular preference is given to compounds of the formula I in which L is F, and to compounds of the formula I in which $R^1$ is alkyl or alkoxy having 1 to 7 carbon atoms.

The compounds of the formula I have high dielectric anisotropy values and relatively high birefringence and clearing point values. Their use in liquid-crystal mixtures for IPS displays according to the invention facilitates high dielectric anisotropies and low rotational viscosities with retention of high clearing points and favourable birefringence values and produces low threshold voltages and short response times.

It has been found, in particular, that mixtures according to the invention comprising compounds of the formula I have significantly higher clearing point and dielectric anisotropy values, lower rotational viscosity and threshold voltage values, and shorter response times than, for example, analogous mixtures which, instead of the compounds of the formula I, comprise 3,5-difluoro-4-cyanophenylcyclohexanes of the formula:

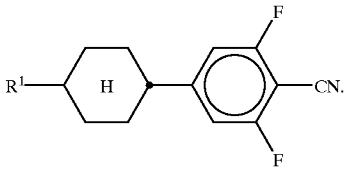

The compounds of the formula I are disclosed in DE 44 10 606. However, this specification does not describe IPS displays.

Preferred embodiments are IPS displays in which a) the liquid-crystalline medium comprises one or more compounds of the formula II containing a cyano group:

II

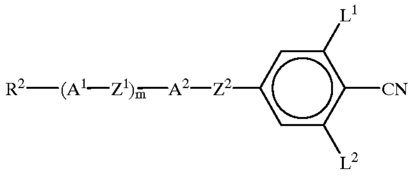

in which $R^2$ is H, an alkyl or alkenyl radical having 1 to 15 carbon atoms which is unsubstituted, monosubstituted by CN or $CF_3$ or at least monosubstituted by halogen, where one or more $CH_2$ groups in these radicals may also each, independently of one another, be replaced by —O—, —S—, —CO—, —CO—O—, —O—CO— or —O—CO—O— in such a way that O atoms are not linked directly to one another, $A^1$ and $A^2$ are each, independently of one another, (a) a trans-1,4-cyclohexylene radical or 1,4-cyclohexenylene radical, in which, in addition, one or more non-adjacent $CH_2$ groups may be replaced by —O— and/or —S—, (b) a 1,4-phenylene radical, in which, in addition, one or two CH groups may be replaced by N, (c) a radical from the group consisting of 1,4-bicyclo-[2.2.2]octylene, piperidine-1,4-diyl, naphthalene-2,6-diyl, decahydronaphthalene-2,6-diyl and 1,2,3,4-tetrahydronaphthalene-2,6-diyl, where the radicals (a) and (b) may be substituted by one or two fluorine atoms, $Z^1$ and $Z^2$ are each, independently of one another, —CO—O—, —O—CO—, $—CH_2O—$, $—OCH_2—$, $—CH_2CH_2—$, —CH═CH—, —C≡C—, —CHF—CHF—, —CF═CF—, $—CF_2O—$, $—OCF_2—$, $—CF_2CF_2—$ or a single bond, and one of the radicals $Z^1$ and $Z^2$ may alternatively be $—(CH_2)_4—$ or $—CH═CH—CH_2CH_2—$, $L_1$ and $L_2$ are each, independently of one another, H or F; and m is 0, 1 or 2;

b) the liquid-crystalline medium comprises one or more compounds of the formula III containing a 3,4,5-trifluorophenyl group:

III

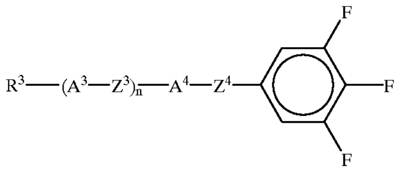

in which $R^3$ has one of the meanings indicated for $R^2$ in the formula II, $A^3$ and $A^4$ each, independently of one another, have one of the meanings indicated for $A^1$ and $A^2$ in the formula II, $Z^3$ and $Z^4$ each, independently of one another, have one of the meanings indicated for $Z^1$ and $Z^2$ in the formula II, and n is 0, 1 or 2;

c) the liquid-crystalline medium comprises one or more compounds of the formula IV:

$$R^4—(A^5—Z^5)_o—A^6—R^5 \qquad IV$$

in which $R^4$ and $R^5$ each, independently of one another, have one of the meanings indicated for $R^2$ in the formula II, $A^5$ and $A^6$ each, independently of one another, have one of the meanings indicated for $A^1$ and $A^2$ in the formula II, each $Z^5$, independently of the others, has one of the meanings indicated for $Z^1$ and $Z^2$ in the formula II, and o is 1, 2 or 3;

d) the liquid-crystalline medium comprises one or more compounds of the formula V:

V

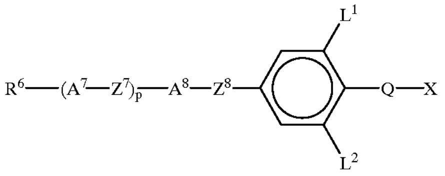

in which $R^6$ has one of the meanings indicated for $R^2$ in the formula II, $A^7$ and $A^8$ each, independently of one another, have one of the meanings indicated for $A^1$ and $A^2$ in the formula II, $Z^7$ and $Z^8$ each, independently of one another, have one of the meanings indicated for $Z^1$ and $Z^2$ in the formula II, $L^1$ and $L^2$ are each, independently of one another, H or F, Q is a polyfluoroalkylene radical of the formula $—(O)_q—(CH_2)_r—(CF_2)_s—$, in which q is 0 or 1, r is 0, 1, 2, 3, 4, 5 or 6, and s is 1, 2, 3, 4, 5 or 6, X is H, F or Cl, and p is 0, 1 or 2.

The compounds of the formula II are preferably selected from the group comprising the formulae IIa to IIp:

IIa

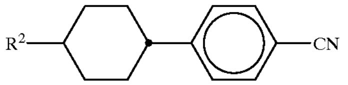

IIb

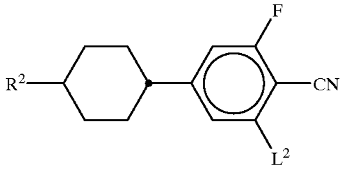

IIc

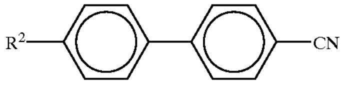

IId

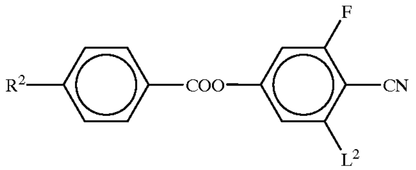

IIe

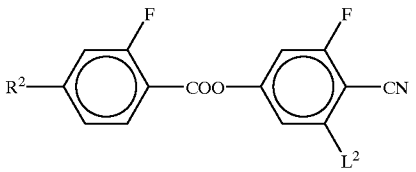

-continued

IIf

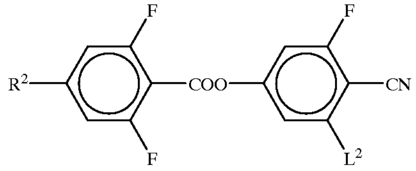

IIg

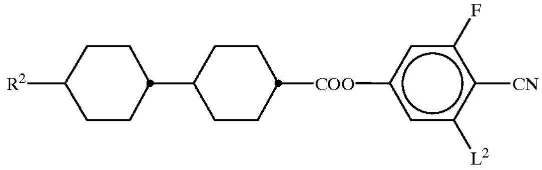

IIh

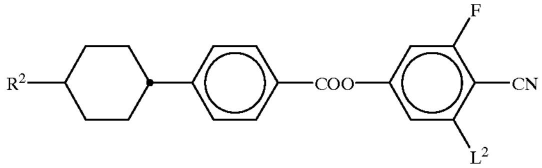

IIi

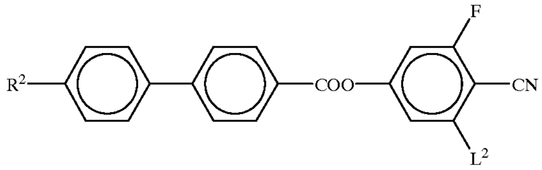

IIk

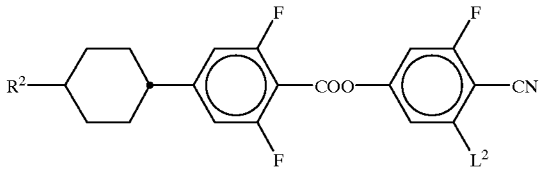

IIm

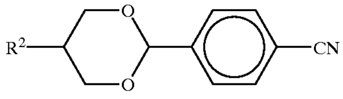

IIn

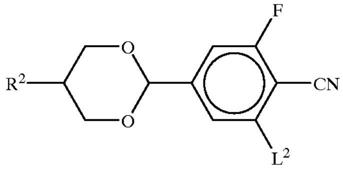

IIo

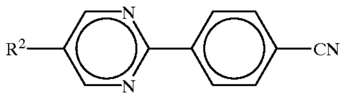

-continued

IIp

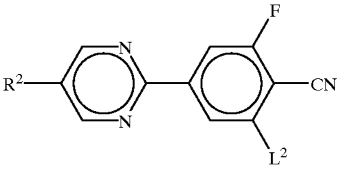

in which $R^2$ is as defined in the formula II, and $L^2$ is H or F.

In the compounds of the formulae IIb, IIe, IIk, IIn and IIp, $L^2$ is particularly preferably F. In the compounds of the formulae IId, IIg, IIh and IIi, $L^2$ is particularly preferably H.

The liquid-crystalline medium particularly preferably comprises one or more compounds selected from the group consisting of the compounds of the formulae IIa, IIb, IIc, IId, IIh and IIk.

In a further preferred embodiment, the liquid-crystalline medium comprises at least one heterocyclic compound selected from the group comprising the formulae IIm, IIn, IIo and IIp.

The compounds of the formula III are preferably selected from the group comprising the formulae IIIa to IIIi:

IIIa

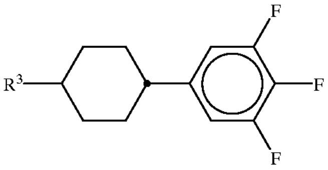

IIIb

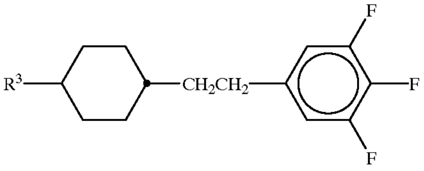

IIIc

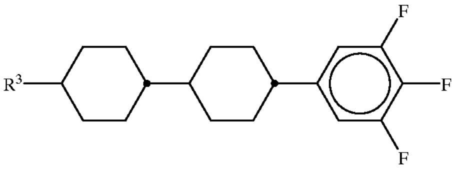

IIId

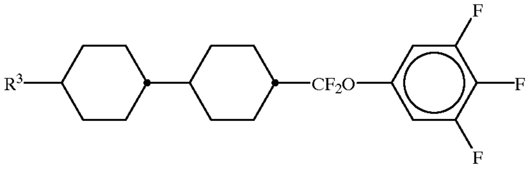

IIIe

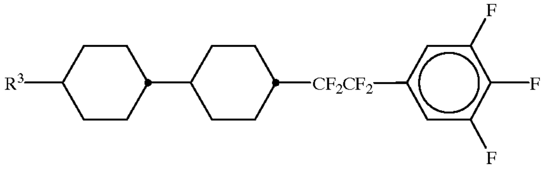

-continued

IIIf

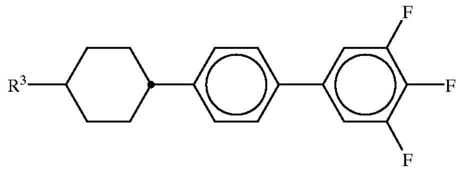

IIIg

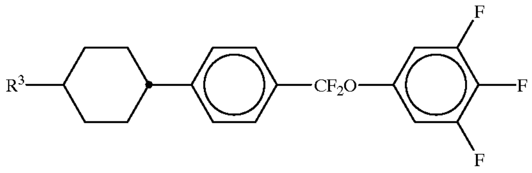

IIIh

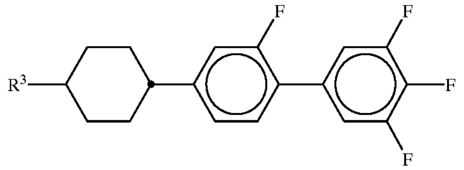

IIIi

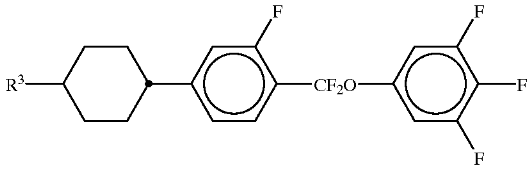

IIIk

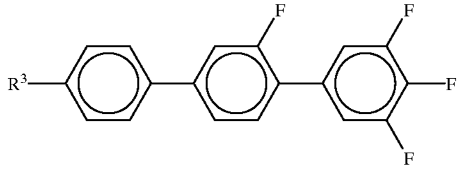

IIIm

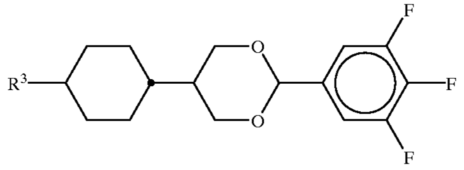

IIIn

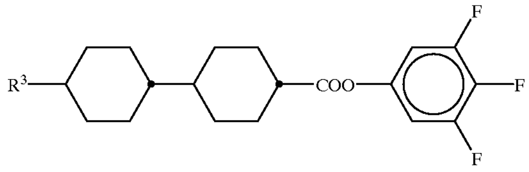

IIIo

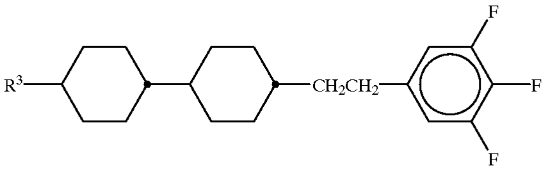

-continued

IIIp

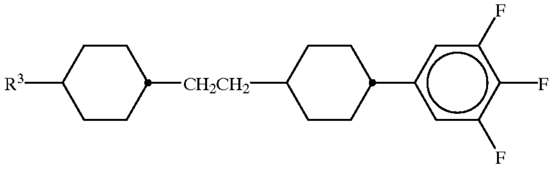

IIIq

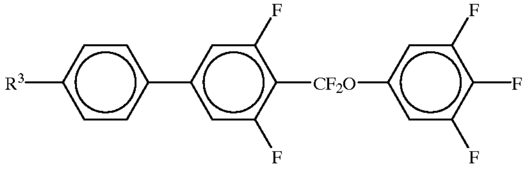

IIIr

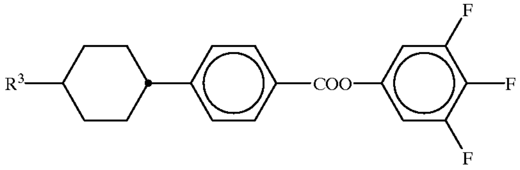

in which $R^3$ is as defined in the formula III.

The liquid-crystal display particularly preferably contains a liquid-crystalline medium comprising one or more compounds selected from the group comprising the formulae IIIc, IIId, IIIe, IIIf, IIIg, IIIh, IIIi, IIIk and IIIn.

The compounds of the formula IV are preferably selected from the group comprising the formulae IVa to IVm:

IVa

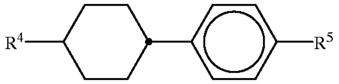

IVb

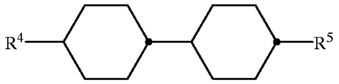

IVc

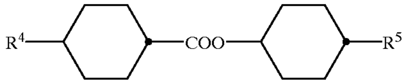

IVd

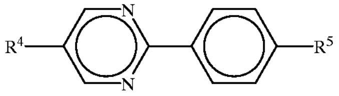

IVe

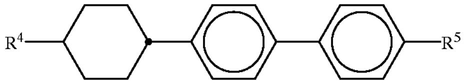

IVf

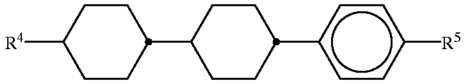

-continued

IVg

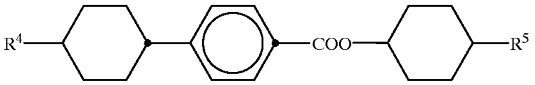

IVh

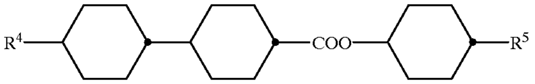

IVi

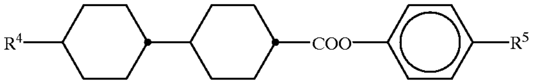

IVk

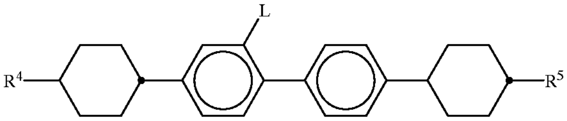

IVm

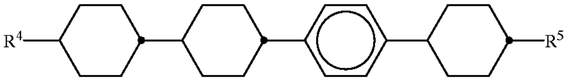

in which $R^4$ and $R^5$ are as defined in the formula IV, and L is H or F.

In the compounds of the formula IVk, L is particularly preferably F.

The liquid-crystal display particularly preferably contains a liquid-crystalline medium comprising one or more compounds selected from the group consisting of the compounds of the formulae IVb, IVe, IVk and IVm.

The compounds of the formula V are preferably selected from the group comprising the formulae Va to Vi:

Va

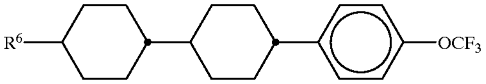

Vb

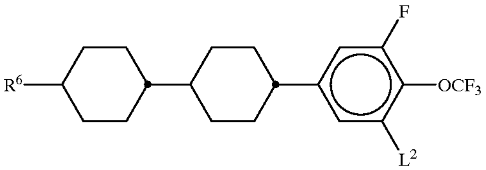

Vc

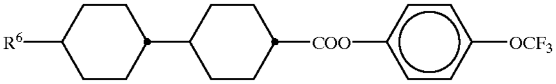

-continued

Vd

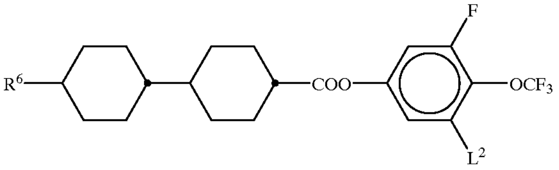

Ve

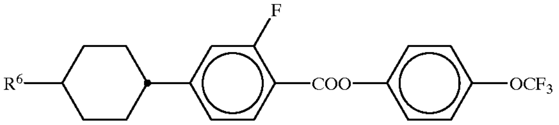

Vf

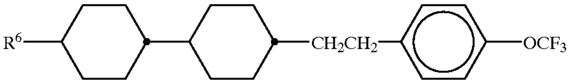

Vg

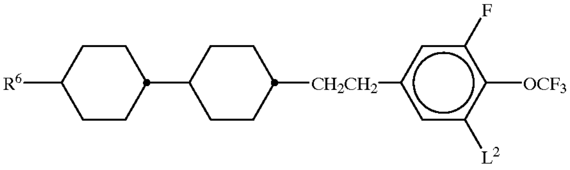

Vh

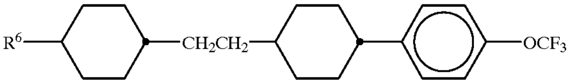

Vi

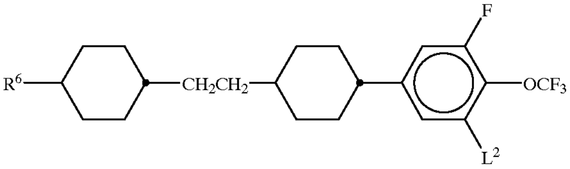

in which $R^6$ is as defined in the formula V, and L is H or F.

In the compounds of the formula Vd, $L^2$ is particularly preferably F.

The liquid-crystalline medium particularly preferably contains one or more compounds selected from the group consisting of the compounds of the formulae Va, Vc, Vd, Ve and Vf.

In a further preferred embodiment, the liquid-crystalline medium comprises one or more alkenyl compounds of the formula VI:

VI

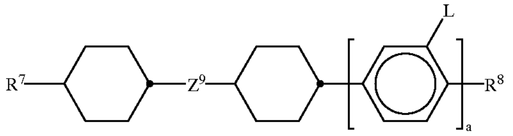

in which $R^7$ is an alkenyl group having 2 to 7 carbon atoms, $Z^9$ is —CH═CH— or a single bond, L is H or F, a is 0 or 1, and $R^8$ is an alkyl, alkoxy or alkenyl group having 1 to 12 carbon atoms, in which, in addition, one or two non-adjacent $CH_2$ groups may be replaced by —O—, —CH═CH—, —CO—, —OCO— or —COO— in such a way that O atoms are not linked directly to one another, or, if a is 1, is alternatively F.

The compounds of the formula VI are preferably selected from the group comprising the formulae VIa to VIf:

VIa

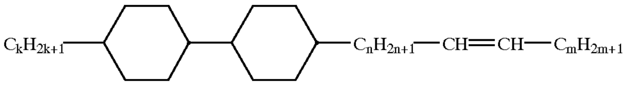

VIb

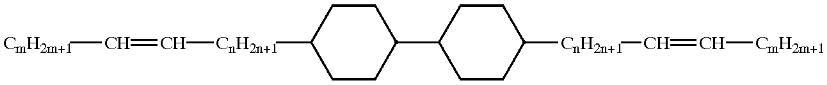

VIc

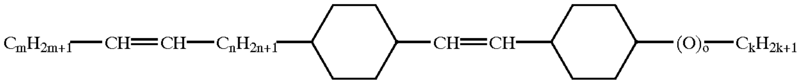

VId

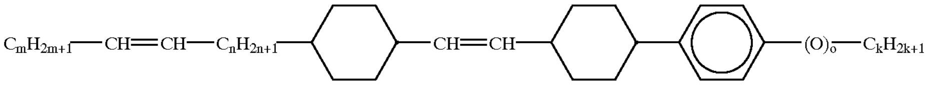

VIe

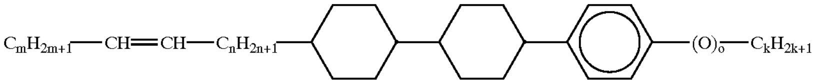

VIf

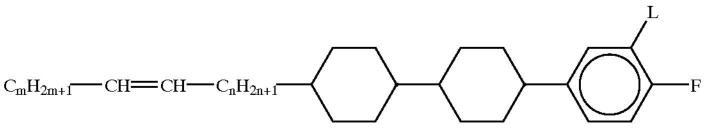

in which k is 1, 2, 3, 4 or 5, m and n are each, independently of one another, 0, 1, 2 or 3, where m+n is ≦5, and o is 0 or 1.

In the compounds of the formula IIIf, L is preferably F.

Further preferred embodiments are the following IPS displays:

the medium additionally comprises one or more compounds containing a 4-fluorophenyl group, selected from the group consisting of the formulae VIIa to VIIc:

VIIa

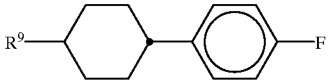

VIIb

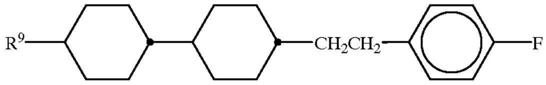

VIIc

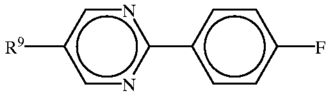

in which $R^9$ has the one of the meanings indicated for $R^3$ in the formula III, and in particular is alkyl having 1 to 7 carbon atoms;

the medium additionally comprises one or more compounds of the formula VIII:

VIII

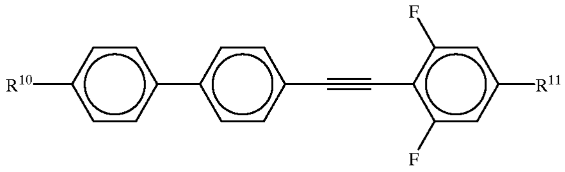

in which $R^{10}$ and $R^{11}$ are each, independently of one another, alkyl or alkoxy, preferably alkyl, having 1 to 7 carbon atoms;

the medium additionally comprises one or more compounds of the formula IX:

IX

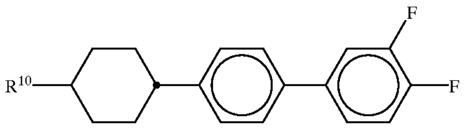

the medium additionally comprises one or more compounds of negative dielectric anisotropy selected from the group consisting of the formulae X and XI:

X

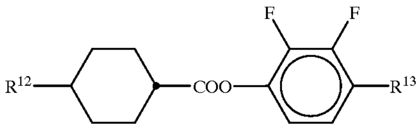

XI

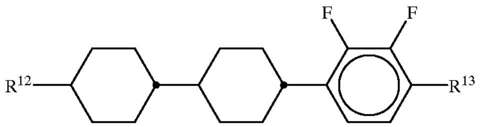

in which $R^{12}$ and $R^{13}$ are each, independently of one another, alkyl or alkoxy having 1 to 7 carbon atoms, $R^{12}$ is preferably alkyl, $R^{13}$ is preferably alkoxy.

Preference is given to displays containing liquid-crystal mixtures comprising one or more cyano compounds selected from the group comprising the formulae IIa, IIb, IId, IIg and IIk, in particular compounds of the formulae IIb, IIg and IIk in which $L^2$ is F, and compounds of the formula IId in which $L^2$ is H, one or more dioxane compounds selected from the group comprising the formulae IIm and IIn, in particular of the formula IIn in which $L^2$ is F, one or more 3,4,5-trifluorophenyl compounds selected from the group comprising the formulae IIIc, IIIg and IIIh, one or more compounds selected from the group comprising the formulae IVb, IVh, IVk and IVm, in which $R^4$ and $R^5$ are preferably straight-chain alkyl having 1 to 7 carbon atoms, in the compounds of the formula IVb $R^5$ is preferably alkoxy having 1 to 5 carbon atoms, and in the compounds of the formula IVk L is preferably F, one or more compounds selected from the group comprising the formulae Va, Vc and Vg, one or more alkenyl compounds selected from the group comprising the formulae VIa, VIb, VIe and VIf, where in the compounds of the formula VIa, preferably m and/or n, particularly preferably m and n, are 0, in the compounds of the formula VIb, n is preferably 0, in the compounds of the formula VIe, k is preferably 0, in the compounds of the formula VIf, L is preferably F, and m and n are preferably 0, from 2 to 40% by weight, in particular from 3 to 25% by weight, of one or more, preferably one, two or three, compounds of the formula I.

Preference is furthermore given to a liquid-crystal display according to the invention in which the pixels are addressed by means of an active matrix.

The invention furthermore relates to a liquid-crystalline medium of positive dielectric anisotropy comprising at least one compound of the formula I, at least one compound selected from the group consisting of the compounds of the formulae IIa to IIp, IIIa to IIIk and Va to Vi, at least one compound selected from the group consisting of the compounds of the formulae VIa to VIf, and, if desired, one or more compounds selected from the group consisting of the compounds of the formulae IVa to IVm, in particular which comprises from 2 to 40, preferably from 3 to 30, particularly preferably from 3 to 22% by weight of at least one compound of the formula I, from 15 to 85, preferably from 20 to 65% by weight of at least one compound selected from the group consisting of the compounds of the formulae II and III, from 0 to 75, preferably from 10 to 67, particularly preferably from 15 to 40% by weight of at least compound of the formula II, from 0 to 55, preferably from 5 to 50, particularly preferably from 10 to 40% by weight of at least one compound of the formula III, from 0 to 60, preferably from 5 to 45% by weight of at least one compound of the formula IV, from 0 to 40, preferably from 5 to 35, particularly preferably from 10 to 25% by weight of at least one compound of the formula V, from 0 to 55, preferably from 5 to 45% by weight of at least one compound of the formula VI.

The liquid-crystalline media used in accordance with the invention generally have a birefringence ($\Delta n$) of <0.14, preferably in the range from 0.06 to 0.13, in particular in the range from 0.09 to 0.12, with clearing points of from 65 to 95° C., in particular from 70 to 85° C.

The flow viscosity (at 20° C.) of the mixtures used in accordance with the invention is generally less than 30 $mm^2 \cdot s^{-1}$, in particular between 15 and 25 $mm^2 \cdot s^{-1}$. The resistivity of the materials according to the invention is generally, at 20° C., from $5\times10^{10}$ to $5\times10^{13}$ $\Omega\cdot$cm, particularly preferably from $5\times10^{11}$ to $5\times10^{12}$ $\Omega\cdot$cm. The rotational viscosity of the mixtures according to the invention is generally, at 20° C., less than 140 mPa·s, in particular from 80 to 130 mPa·s.

Media having clearing points of from 70 to 80° C. which are used in accordance with the invention have rotational viscosities of 130 mPa·s or less, preferably from 80 to 120 mPa·s.

The clearing point of the media used in accordance with the invention is greater than 60° C., preferably greater than 70° C. and particularly preferably 75° C. or greater. In particular, the clearing point is in the range from 60° C. to 85° C. The shelf life in test cells, determined as described below, is 1000 hours or more at −30° C., preferably 500 hours or more at −40° C. and very particularly preferably 1000 hours or more at −40° C.

The media used in accordance with the invention consist of from 5 to 30 compounds, preferably of from 6 to 20 compounds and particularly preferably of from 7 to 16 compounds.

It has been found that even a relatively low proportion of compounds of the formula I in a mixture with conventional liquid-crystal materials, but in particular with one or more compounds selected from the group consisting of the compounds of the formulae IIa to IIIk and/or from the group consisting of the compounds of the formulae IVa to VIf, results in a significant lowering of the threshold voltage, in favourable rotational viscosity values $\gamma_1$ and in fast response times, with, in particular, broad nematic phases with low smectic-nematic transition temperatures being observed. The compounds of the formulae I to VI are colorless, stable and readily miscible with one another and with other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are preferred, unless explicitly stated otherwise.

The term "alkenyl" covers straight-chain and branched alkenyl groups having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of very particularly preferred alkenyl groups are vinyl, 1E-propenyl, 1E-butenyl, 1E-pentenyl, 1E-hexenyl, 1E-heptenyl, 3E-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are preferred, unless explicitly stated otherwise.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "alkoxyalkyl" preferably covers straight-chain radicals of the formula $C_nH_{2n+1}$—O—$(CH_2)_m$, in which n and m are each, independently of one another, from 1 to 6. Preferably, m=1 and n is from 1 to 4.

Through a suitable choice of the meanings of $R^1$ to $R^{13}$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl and alkoxy radicals. 4-alkenyl radicals, 3-alkenyl radicals and the like generally give lower threshold voltages and smaller values of $k_{33}/k_{11}$ compared with alkyl and alkoxy radicals.

The optimum mixing ratio of the compounds of the formulae I–VI depends substantially on the desired properties, on the choice of the components of the formulae I, II, III, IV, V and/or VI and on the choice of any further components present. Suitable mixing ratios within the range indicated above can easily be determined from case to case.

The total amount of compounds of the formulae I to VI in the mixtures according to the invention is not crucial. The mixtures preferably consist of 50–90% by weight of compounds of the formulae I to VI. The mixtures may also comprise one or more further components in order to optimize various properties. However, the observed effect, particularly on the low-temperature stability, is generally greater the higher the total concentration of compounds of the formulae I to VI.

The liquid-crystalline media according to the invention preferably comprise from 2 to 40, in particular from 4 to 30, compounds as further constituents besides one or more compounds of the formula I. These media very particularly preferably comprise from 7 to 25 compounds besides one or more compounds of the formula I. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of media according to the invention can be characterized by the formulae 1, 2, 3, 4 and 5:

R'—L—E—R" 1

R'—L—COO—E—R" 2

R'—L—OOC—E—R" 3

R'—L—$CH_2CH_2$—E—R" 4

R'—L—C≡C—E—R" 5

In the formulae 1, 2, 3, 4 and 5, L and E, which may be identical or different, are each, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexylene, Pyr is pyrimidine-2,5-diyl or pyridine-2,5-diyl, Dio is 1,3-dioxane-2,5-diyl, and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The media according to the invention preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

In a smaller sub-group of the compounds of the formulae 1, 2, 3, 4 and 5, R' and R" are each, independently of one another, alkyl, alkenyl, alkoxy, alkoxyalkyl, alkenyloxy or alkanoyloxy having up to 8 carbon atoms. This smaller sub-group is called Group A below, and the compounds are referred to by the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5, which is known as Group B, R" is —F, —Cl, —NCS or —$(O)_iCH_{3-(k+l)}F_kCl_l$, where i is 0 or 1, and k+l is 1, 2 or 3; the compounds in which R" has this meaning are referred to by the sub-formulae 1b, 2b, 3b, 4b and 5b. Particular preference is given to those compounds of the sub-formulae 1b, 2b, 3b, 4b and 5b in which R" is —F, —Cl, —NCS, —$CF_3$, —$OCHF_2$ or —$OCF_3$.

In the compounds of the sub-formulae 1b, 2b, 3b, 4b and 5b, R' is as defined for the compounds of the sub-formulae 1a–5a and is preferably alkyl, alkenyl, alkoxy or alkoxyalkyl.

In a further smaller sub-group of the compounds of the formulae 1, 2, 3, 4 and 5, R" is —CN; this sub-group is referred to below as Group C, and the compounds of this sub-group are correspondingly described by sub-formulae 1c, 2c, 3c, 4c and 5c. In the compounds of the sub-formulae 1c, 2c, 3c, 4c and 5c, R' is as defined for the compounds of the sub-formulae 1a–5a and is preferably alkyl, alkoxy or alkenyl.

Besides the preferred compounds of groups A, B and C, other compounds of the formulae 1, 2, 3, 4 and 5 having other variants of the proposed substituents are also customary. All these substances are obtainable by methods which are known from the literature or analogously thereto.

Besides the compounds of the formula I to VI, the media according to the invention preferably comprise one or more compounds selected from Group A and/or Group B and/or Group C. The proportions by weight of the compounds from these groups in the media according to the invention are preferably Group A: from 0 to 90%, preferably from 20 to 90%, in particular from 30 to 90%

Group B: from 0 to 80%, preferably from 10 to 80%, in particular from 10 to 65%

Group C: from 0 to 80%, preferably from 5 to 80%, in particular from 5 to 50%, the sum of the proportions by weight of the Group A and/or B and/or C compounds present in the respective media according to the invention preferably being from 5% to 90% and in particular from 10% to 90%.

The structure of the IPS display according to the invention corresponds to the usual design for displays of this type, as described, for example, in WO 91/10936 or EP 0 588 568. The term usual design is broadly drawn here and also covers all derivatives and modifications of the IPS display, in particular, for example, also matrix display elements based on poly-Si TFT or MIM.

However, an essential difference of the displays according to the invention from those usual hitherto consists in the choice of the liquid-crystal parameters of the liquid-crystal layer.

The liquid-crystal mixtures which can be used in accordance with the invention are prepared in a manner conventional per se. In general, the desired amount of the components used in smaller amount is dissolved in the components making up the principal constituent, advantageously at elevated temperature. It is also possible to prepare the mixtures in other conventional manners, for example by use of premixtures, for example homologue mixtures, or using so-called "multibottle" systems.

The dielectrics may also comprise further additives known to the person skilled in the art and described in the literature. For example, 0–15%, preferably 0–10%, of pleochroic dyes and/or chiral dopants may be added.

The individual compounds added are employed in concentrations of from 0.01 to 6% and preferably from 0.1 to 3%. However, the concentrations given here for the other constituents of the liquid-crystal mixtures, i.e. the liquid-crystalline or mesogenic compounds, are indicated without taking into account the concentration of these additives.

Above and below,

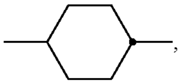,
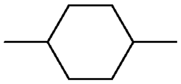
and
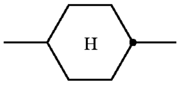

denote trans 1,4-cyclohexylene.

The physical properties of the liquid-crystal mixtures are determined in accordance with "Physical Properties of Liquid Crystals" Ed. M. Becker, Merck KGaA, as of November 1997, unless explicitly stated otherwise.

C denotes a crystalline phase, S a smectic phase, $S_C$ a smectic C phase, $S_A$ a smectic A phase, N a nematic phase and I the isotropic phase. $V_0$ denotes the capacitive threshold voltage. $\Delta n$ denotes the optical anisotropy, and $n_0$ the ordinary refractive index (in each case at 589 nm). $\Delta\epsilon$ denotes the dielectric anisotropy ($\Delta\epsilon=\epsilon_{\|}-\epsilon_{\perp}$, where $\epsilon_{\|}$ denotes the dielectric constant parallel to the longitudinal molecular axes and $\epsilon_{\perp}$ denotes the dielectric constant perpendicular thereto, in each case at 1 kHz). The electro-optical data were measured in a planar cell at 20° C., unless expressly stated otherwise. All physical properties are indicated and measured at 20° C., unless expressly stated otherwise.

The cells are preferably bright in the "off" state.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius, and, unless otherwise indicated, all parts and percentages are by weight.

The entire disclosure of all applications, patents and publications, cited above or below, and of corresponding German Application No. DE 100 17 385.3 filed Apr. 7, 2000, is hereby incorporated by reference.

$\Delta n$ denotes optical anisotropy (589 nm, 20° C.), $\Delta\epsilon$ denotes the dielectric anisotropy (1 kHz, 20° C.), H.R. denotes the voltage holding ratio (at 100° C., after 5 minutes in an oven at 1 V), and $V_0$, the capacitive threshold voltage, was determined at 20° C. and 1 kHz.

The calibrated rotational viscometer gave a rotational viscosity $\gamma_1$ for ZLI-4792 (Merck KGaA) of 133 mPa·s at 20° C.

The shelf life was investigated in sealed test cells with an optical retardation of about 0.5 μm with CU-1511 from DuPont, USA, as alignment layer. To this end, in each case five test cells were bonded on both sides to crossed polarizers and stored at fixed temperatures of 0° C., −10° C., −20° C., −30° C. and −40° C. At intervals of 24 hours in each case, the cells were assessed visually for changes. The storage time noted at the respective temperature $t_{store}$ (T) was the final time at which a change was just not observed in any cell.

In the present application and in the examples below, the structures of the liquid-crystal compounds are indicated by means of acronyms, the transformation into chemical formulae taking place in accordance with Tables A and B below. All radicals $C_nH_{2n+1}$ are straight-chain alkyl radicals having n carbon atoms. The coding in Table B is self-evident. In Table A, only the acronym for the parent structure is indicated, followed in individual cases, separated from the acronym for the parent structure by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | F | H |
| $nCF_3$ | $C_nH_{2n+1}$ | $CF_3$ | H | H |
| $nOCF_3$ | $C_nH_{2n+1}$ | $OCF_3$ | H | H |
| $nOCF_3$ | $C_nH_{2n+1}$ | $OCF_3$ | H | H |
| $nOCF_2$ | $C_nH_{2n+1}$ | $OCHF_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_2H_{2s}$— | CN | H | H |
| nAm | $C_nH_{2n+1}$ | C≡C—$C_mH_{2m+1}$ | H | H |
| nF.F.F | $C_nH_{2n+1}$ | F | F | F |
| nCl.F.F | $C_nH_{2n+1}$ | Cl | F | F |

-continued

| Code for $R^1$, $R^2$, $L^1$, $L^2$ | $R^1$ | $R^2$ | $L^1$ | $L^2$ |
|---|---|---|---|---|
| $nCF_3$.F.F | $C_nH_{2n+1}$ | $CF_3$ | F | F |
| $nOCF_3$.F.F | $C_nH_{2n+1}$ | $OCF_3$ | F | F |
| $nOCF_2$.F.F | $C_nH_{2n+1}$ | $OCHF_2$ | F | F |
| $nOCF_3$.F | $C_nH_{2n+1}$ | $OCF_3$ | F | H |

Preferred displays contain media comprising, in particular, one or more compounds from Tables A and B in addition to the compounds of the formula I.

Particularly preferred IPS displays contain media comprising one or more compounds of one of the formulae from Table A and one or more compounds of the formulae from Table B in each case one or more compounds of two or more different types of compounds of the formulae from Table A in each case one or more compounds of two or more different types of compounds of the formulae from Table B in each case one or more compounds of four or more compounds from the group consisting of the compounds of the formulae from Tables A and B.

TABLE A

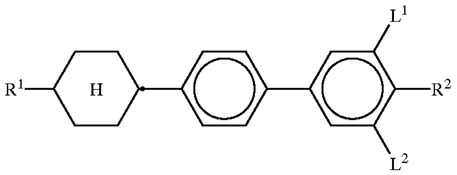

BCH

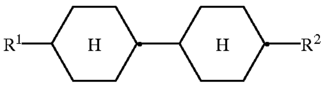

CCH

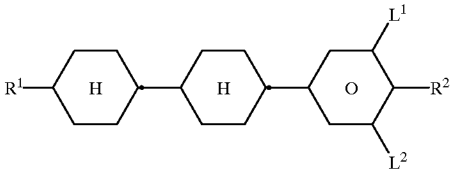

CCP

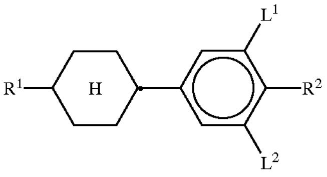

PCH

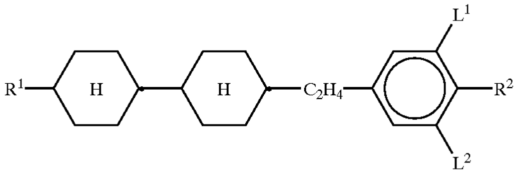

ECCP

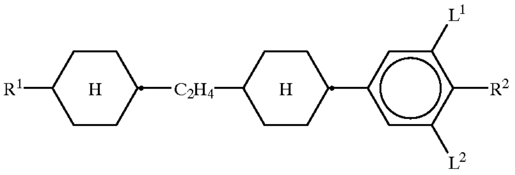

CECP

TABLE A-continued
| | |
|---|---|
| 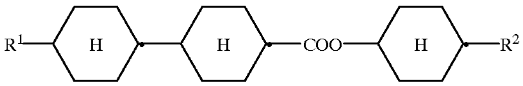 CH | 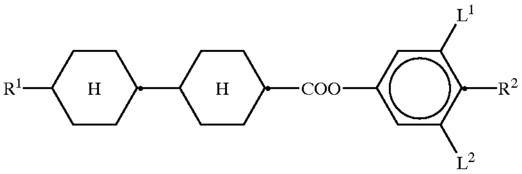 CP |
| 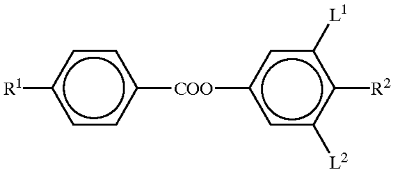 ME | 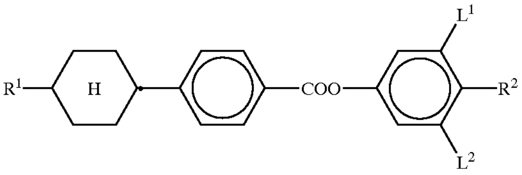 HP |
| 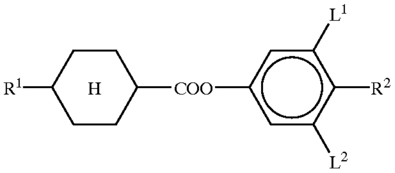 D | 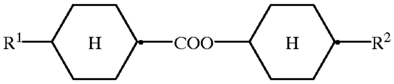 OS |
| 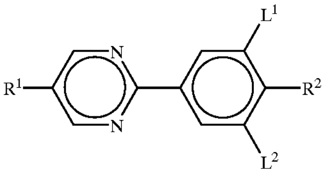 PYP | 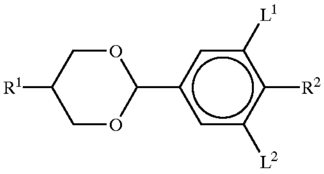 PDX |
| 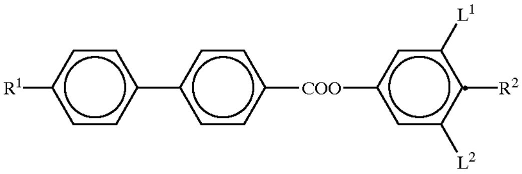 CE | 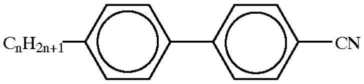 K3.n |
| 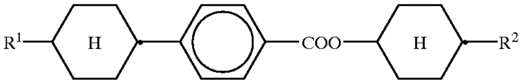 HD | 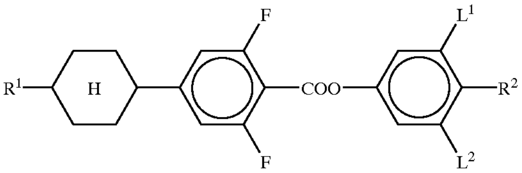 CUZP |

TABLE B
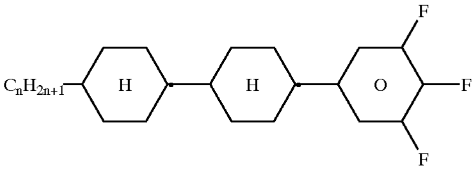
CCP-nF.F.F
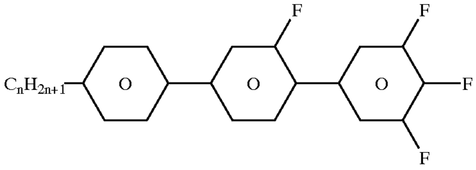
PGU-n-F
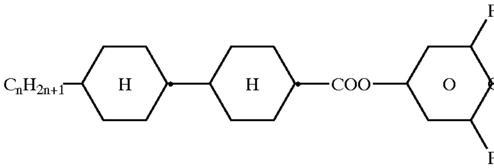
CCZU-n-F
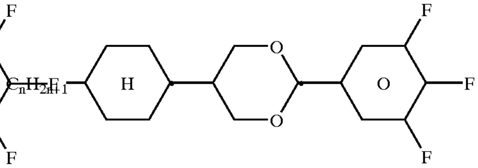
CDU-n-F
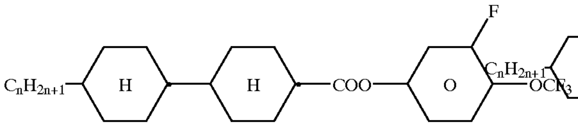
CCZG-n-OT
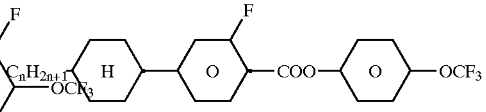
CGZP-n-OT
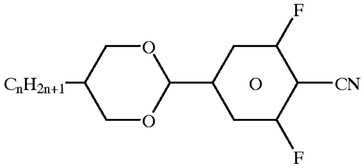
DU-n-N
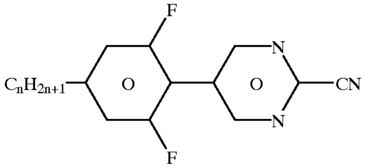
UM-n-N
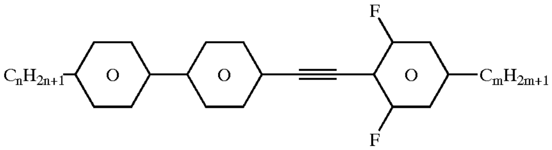
PPTUI-n-m
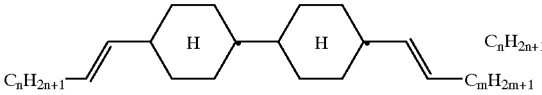
CCP-nV-Vm
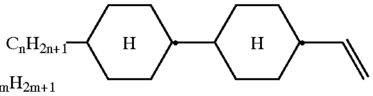
CC-n-V
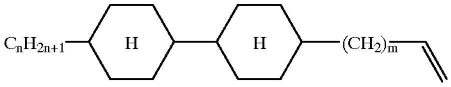
CC-n-mV
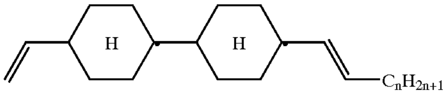
CC-V-Vn
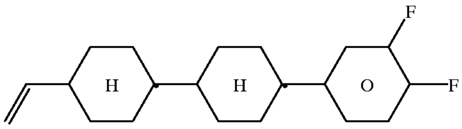
CCG-V-F
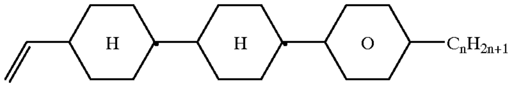
CCP-V-m TABLE B-continued

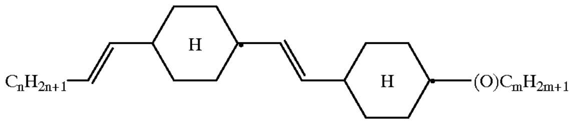

CVCP-nV-(O)m

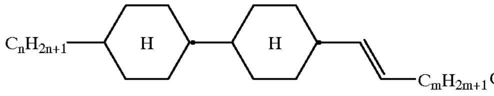 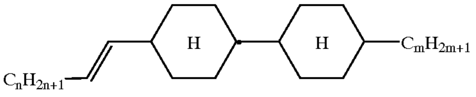

CC-n-Vm CC-nV-m

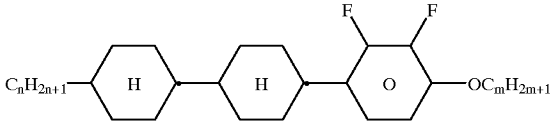

CCP-n0mFF

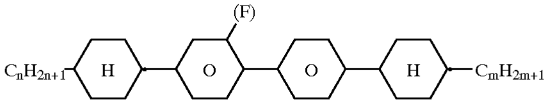

CBCP-nm(F)

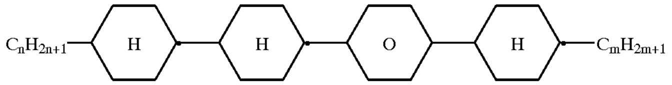

CCPC-nm

EXAMPLE 1

An IPS display contains a nematic mixture having

| | |
|---|---|
| clearing point | 87.0° C. |
| $\Delta\epsilon$ [1 kHz, 20° C.] | 17.5 |
| $\epsilon_{\perp}$ [1 kHz, 20° C.] | 5.1 |

consisting of

| Compound | c/% by weight |
|---|---|
| PCH-3 | 20.0 |
| K6 | 6.4 |
| K9 | 7.2 |
| $CCP-20CF_3$ | 4.0 |
| $CCP-30CF_3$ | 4.0 |
| $CCP-40CF_3$ | 4.0 |
| $CCP-50CF_3$ | 4.0 |
| $ECCP-20CF_3$ | 4.0 |
| $ECCP-30CF_3$ | 4.0 |
| $ECCP-50CF_3$ | 4.0 |
| ECCP-3F | 4.0 |
| ECCP-5F | 4.0 |
| CBC-33F | 4.0 |

-continued

| Compound | c/% by weight |
|---|---|
| CBC-53F | 3.2 |
| CBG-55F | 3.2 |
| UM-3-N | 20.0 |
| Σ | 100.0 |

and has adequate contrast.

EXAMPLE 2

An IPS display contains a nematic mixture consisting of

| Compound | c/% by weight |
|---|---|
| PCH-32 | 17.6 |
| PCH-301 | 16.0 |
| PCH-302 | 12.0 |
| BCH-32 | 15.2 |
| BCH-52 | 11.2 |
| CBC-33 | 4.0 |
| CBC-53 | 4.0 |
| UM-3-N | 20.0 |
| Σ | 100.0 |

and has adequate contrast.

EXAMPLE 3

An IPS display contains a nematic mixture consisting of

| Compound | c/% by weight |
|---|---|
| UM-3-N | 5.0 |
| ME4N.F | 7.0 |
| ME5N.F | 8.0 |
| ME7N.F | 8.0 |
| PCH-2 | 6.0 |
| PCH-3 | 17.0 |
| PCH-5 | 10.0 |
| PCH-7 | 10.0 |
| CBC-33 | 5.0 |
| CBC-53 | 5.0 |
| CBC-55 | 4.0 |
| CCPC-33 | 5.0 |
| CCPC-34 | 5.0 |
| CCPC-35 | 5.0 |
| Σ | 100.0 |

and has adequate contrast.

EXAMPLE 4

An IPS display contains a nematic mixture having

| | |
|---|---|
| clearing point | 87.0° C. |
| Δn [589 nm, 20° C.] | 0.1384 |
| $n_o$ [589 nm, 20° C.] | 1.4951 |

| Compound | c/% by weight |
|---|---|
| UM-3-N | 5.0 |
| ME4N.F | 7.0 |
| ME5N.F | 8.0 |
| ME7N.F | 8.0 |
| PCH-2 | 6.0 |
| PCH-3 | 17.0 |
| PCH-5 | 10.0 |
| PCH-7 | 9.0 |
| CBC-33 | 5.0 |
| CBC-53 | 5.0 |
| CBC-55 | 5.0 |
| CCPC-33 | 5.0 |
| CCPC-34 | 5.0 |
| CCPC-35 | 5.0 |
| Σ | 100.0 |

and has adequate contrast.

EXAMPLE 5

An IPS display contains a nematic mixture consisting of

| Compound | c/% by weight |
|---|---|
| UM-3-N | 10.0 |
| BCH-3F.F | 10.8 |
| BCH-5F.F | 9.0 |
| ECCP-30CF3 | 4.5 |
| ECCP-50CF3 | 4.5 |
| CBC-33F | 1.8 |
| CBC-53F | 1.8 |
| CBC-55F | 1.8 |
| PCH-6F | 7.2 |
| PCH-7F | 5.4 |
| CCP-20CF3 | 7.2 |
| CCP-30CF3 | 10.8 |
| CCP-40CF3 | 6.3 |
| CCP-50CF3 | 9.9 |
| PCH-5F | 9.0 |
| Σ | 100.0 |

and has adequate contrast.

EXAMPLE 6

An IPS display contains a nematic mixture consisting of

| Compound | c/% by weight |
|---|---|
| UM-3-N | 20.0 |
| ME4N.F | 8.0 |
| PCH-3N.F.F | 10.0 |
| CC-5-V | 10.5 |
| CC-1V-V1 | 8.5 |
| COG-V-F | 17.0 |
| CCPC-33 | 5.0 |
| CCPC-34 | 5.0 |
| CCPC-35 | 3.0 |
| PPTUI-3-2 | 13.0 |
| Σ | 100.0 |

and has adequate contrast.

EXAMPLE 7

An IPS display contains a nematic mixture having

| | |
|---|---|
| clearing point | 79.5° C. |
| Δn [589 nm, 20° C.] | 0.1434 |
| $n_o$ [589 nm, 20° C.] | 1.4956 |
| Δε [1 kHz, 20° C.] | 27.9 |
| $\epsilon_{195}$ [1 kHz, 20° C.] | 7.5 |
| $\gamma_1$ [20° C.] | 211 mPa.s |
| $V_o$ [1 kHz, 20° C.] | 0.56 V |

consisting of

| Compound | c/% by weight |
|---|---|
| CBC-33 | 2.0 |
| CC-1V-V1 | 8.5 |
| CC-5-V | 5.0 |
| CCG-V-F | 17.0 |
| CCPC-33 | 5.5 |
| CCPC-34 | 5.0 |
| CCPC-35 | 4.0 |
| ME3N.F | 7.0 |
| ME4N.F | 16.0 |
| PCH-3N.F.F | 10.0 |
| PPTUI-3-2 | 10.0 |
| UM-3-N | 10.0 |
| Σ | 100.0 |

and has adequate contrast.

EXAMPLE 8

An IPS display contains a nematic mixture having

| | |
|---|---|
| clearing point | 81.5° C. |
| Δn [589 nm, 20° C.] | 0.1423 |
| $n_o$ [589 nm, 20° C.] | 1.4953 |
| Δε [1 kHz, 20° C.] | 27.1 |
| $\epsilon_\perp$ [1 kHz, 20° C.] | 7.3 |
| $\gamma_1$ [20° C.] | 228 mPa · s |
| $V_o$ [1 kHz, 20° C.] | 0.58 V |

consisting of

| Compound | c/% by weight |
|---|---|
| UM-3-N | 10.0 |
| ME3N.F | 7.0 |
| ME4N.F | 8.0 |
| ME5N.F | 8.0 |
| PCH-3N.F.F | 10.0 |
| CC-5-V | 5.5 |
| CC-1V-V1 | 8.5 |
| CCG-V-F | 17.0 |
| CCPC-33 | 5.5 |
| CCPC-34 | 5.0 |
| CCPC-35 | 4.0 |
| CBC-33 | 2.0 |
| PPTUI-3-2 | 9.5 |
| Σ | 100.0 |

and has adequate contrast.

EXAMPLE 9

An IPS display contains a nematic mixture having

| | |
|---|---|
| clearing point | 90.5° C. |
| Δn [589 nm, 20° C.] | 0.1455 |
| $n_o$ [589 nm, 20° C.] | 1.4968 |
| Δε [1 kHz, 20° C.] | 27.7 |
| $\epsilon_\perp$ [1 kHz, 20° C.] | 7.3 |
| $\gamma_1$ [20° C.] | 284 mPa · s |
| $V_o$ [1 kHz, 20° C.] | 0.59 V |

consisting of

| Compound | c/% by weight |
|---|---|
| UM-3-N | 10.0 |
| ME3N.F | 7.0 |
| ME4N.F | 8.0 |
| ME5N.F | 8.0 |
| PCH-3N.F.F | 10.0 |
| CC-5-V | 9.0 |
| CCG-V-F | 17.0 |
| CCPC-33 | 5.5 |
| CCPC-34 | 5.5 |
| CCPC-35 | 5.5 |
| CBC-33 | 5.0 |
| PPTUI-3-2 | 9.5 |
| Σ | 100.0 |

and has adequate contrast.

EXAMPLE 10

An IPS display contains a nematic mixture having

| | |
|---|---|
| clearing point | 85.0° C. |
| Δn [589 nm, 20° C.] | 0.1458 |
| $n_o$ [589 nm, 20° C.] | 1.4977 |
| Δε [1 kHz, 20° C.] | 32.2 |
| $\epsilon_\perp$ [1 kHz, 20° C.] | 9.6 |
| $V_o$ [1 kHz, 20° C.] | 0.42 V |

consisting of

| Compound | c/% by weight |
|---|---|
| UM-3-N | 9.0 |
| UM-5-N | 6.0 |
| ME3N.F | 6.0 |
| ME4N.F | 7.0 |
| ME5N.F | 7.0 |
| PCH-3N.F.F | 10.0 |
| CC-5-V | 7.0 |
| CCG-V-F | 17.0 |
| CCPC-33 | 5.5 |
| CCPC-34 | 5.5 |
| CCPC-35 | 5.5 |
| CBC-33 | 5.0 |
| PPTUI-3-2 | 9.5 |
| Σ | 100.0 |

and has adequate contrast.

EXAMPLE 11

An IPS display contains a nematic mixture consisting of

| Compound | c/% by weight |
|---|---|
| CC-5-V | 15.0 |
| CCH-35 | 4.0 |
| CC-3-V1 | 11.0 |
| CCP-2F.F.F | 6.0 |
| CCP-3F.F.F | 7.0 |
| CCP-20CF3 | 6.0 |
| CCP-30CF3 | 7.0 |
| CCP-40CF3 | 6.0 |
| PCH-3N.F.F | 13.0 |
| PCH-5N.F.F | 4.0 |
| CCZU-2-F | 3.0 |
| CCZU-3-F | 14.0 |
| UM-3-N | 2.0 |
| BCH-32 | 2.0 |
| Σ | 100.0 |

and has adequate contrast.

EXAMPLE 12

An IPS display contains a nematic mixture consisting of

| Compound | c/% by weight |
|---|---|
| CDU-2-F | 9.0 |
| CDU-3-F | 9.0 |
| CDU-5-F | 8.0 |
| CCZU-2-F | 6.0 |

-continued

| Compound | c/% by weight |
|---|---|
| CCZU-3-F | 15.0 |
| PCH-3N.F.F | 13.0 |
| UM-3-N | 3.5 |
| CCP-30CF3 | 6.0 |
| CP-30CF3 | 6.0 |
| CP-50CF3 | 6.0 |
| CH-43 | 2.0 |
| CC-3-V1 | 9.5 |
| CC-5-V | 7.0 |
| Σ | 100.0 |

and has adequate contrast.

EXAMPLE 13

An IPS display contains a nematic mixture consisting of

| Compound | c/% by weight |
|---|---|
| CDU-2-F | 9.0 |
| CDU-3-F | 9.0 |
| CDU-5-F | 8.0 |
| CCZU-2-F | 6.0 |
| CCZU-3-F | 15.0 |
| DU-3-N | 12.0 |
| UM-3-N | 3.0 |
| CCP-30CF3 | 5.0 |
| CP-30CF3 | 6.0 |
| CP-50CF3 | 6.0 |
| CH-43 | 2.0 |
| CC-3-V1 | 11.0 |
| CC-5-V | 8.0 |
| Σ | 100.0 |

and has adequate contrast.

EXAMPLE 14

An IPS display contains a nematic mixture consisting of

| Compound | c/% by weight |
|---|---|
| CDU-2-F | 9.0 |
| CDU-3-F | 9.0 |
| CDU-5-F | 8.0 |
| CCZU-2-F | 6.0 |
| CCZU-3-F | 15.0 |
| CCP-30CF3 | 5.0 |
| CP-30CF3 | 6.0 |
| CP-50CF3 | 6.0 |
| CH-43 | 3.0 |
| UM-3-N | 3.0 |
| CC-3-V1 | 11.0 |
| CC-5-V | 3.0 |
| DU-3-N | 14.0 |
| BCH-32 | 2.0 |
| Σ | 100.0 |

and has adequate contrast.

EXAMPLE 15

An IPS display contains a nematic mixture having

| | |
|---|---|
| clearing point | 91.5° C. |
| Δn [589 nm, 20° C.] | 0.1074 |
| $n_o$ [589 nm, 20° C.] | 1.4814 |
| Δε [1 kHz, 20° C.] | 23.8 |
| $\epsilon_\perp$ [1 kHz, 20° C.] | 6.3 |

consisting of

| Compound | c/% by weight |
|---|---|
| CH-33 | 4.0 |
| CH-35 | 4.0 |
| CH-43 | 4.0 |
| CH-45 | 4.0 |
| CCH-302 | 6.0 |
| CCH-303 | 8.0 |
| CCPC-33 | 4.0 |
| CCPC-34 | 4.0 |
| CCPC-35 | 4.0 |
| CUZP-2N.F.F | 4.0 |
| CUZP-3N.F.F | 4.0 |
| CUZP-5N.F.F | 4.0 |
| ECCP-20CF3 | 5.0 |
| ECCP-30CF3 | 5.0 |
| OS-33 | 9.0 |
| PYP-4 | 4.0 |
| PYP-5 | 4.0 |
| PYP-32 | 4.0 |
| PYP-3N.F.F | 4.0 |
| PYP-5N.F.F | 3.0 |
| UM-3-N | 4.0 |
| UM-5-N | 4.0 |
| Σ | 100.0 |

and has adequate contrast.

EXAMPLE 16

An IPS display contains a nematic mixture having

| | |
|---|---|
| clearing point | 86.5° C. |
| Δn [589 nm, 20° C.] | 0.1118 |
| $n_o$ [589 nm, 20° C.] | 1.4826 |
| Δε [1 kHz, 20° C.] | 28.5 |
| $\epsilon_\perp$ [1 kHz, 20° C.] | 7.0 |

consisting of

| Compound | c/% by weight |
|---|---|
| CH-33 | 4.0 |
| CH-35 | 4.0 |
| CH-45 | 4.0 |
| CCH-501 | 3.0 |
| CCH-303 | 10.0 |
| CCPC-33 | 5.0 |
| CCPC-35 | 5.0 |
| CUZP-2N.F.F | 4.0 |
| CUZP-3N.F.F | 4.0 |
| CUZP-5N.F.F | 4.0 |
| ECCP-20CF3 | 5.0 |
| ECCP-30CF3 | 5.0 |
| HP-4N.F | 6.0 |

-continued

| Compound | c/% by weight |
|---|---|
| OS-33 | 9.0 |
| PYP-4 | 4.0 |
| PYP-5 | 4.0 |
| PYP-5F | 4.0 |
| PYP-3N.F.F | 4.0 |
| PYP-5N.F.F | 4.0 |
| UM-3-N | 4.0 |
| UM-5-N | 4.0 |
| Σ | 100.0 |

and has adequate contrast.

EXAMPLE 17

An IPS display contains a nematic mixture having

| | |
|---|---|
| clearing point | 87.0° C. |
| Δn [589 nm, 20° C.] | 0.1106 |
| $n_o$ [589 nm, 20° C.] | 1.4844 |
| Δε [1 kHz, 20° C.] | 34.0 |
| $\epsilon_\perp$ [1 kHz, 20° C.] | 7.9 |

consisting of

| Compound | c/% by weight |
|---|---|
| CH-33 | 4.0 |
| CH-35 | 4.0 |
| CH-45 | 4.0 |
| CCH-501 | 3.0 |
| CCH-303 | 10.0 |
| CCPC-33 | 5.0 |
| CCPC-35 | 5.0 |
| CUZP-2N.F.F | 5.0 |
| CUZP-3N.F.F | 4.0 |
| CUZP-5N.F.F | 5.0 |
| CCZU-3-F | 5.0 |
| CCZU-5-F | 6.0 |
| HP-4N.F | 6.0 |
| OS-33 | 6.0 |
| PYP-4 | 2.0 |
| PYP-5 | 2.0 |
| PYP-5F | 4.0 |
| PYP-3N.F.F | 4.0 |
| PYP-4N.F.F | 4.0 |
| PYP-5N.F.F | 4.0 |
| UM-3-N | 4.0 |
| UM-5-N | 4.0 |
| Σ | 100.0 |

and has adequate contrast.

EXAMPLE 18

An IPS display contains a nematic mixture having

| | |
|---|---|
| clearing point | 74.5° C. |
| Δn [589 nm, 20° C.] | 0.1060 |
| $n_o$ [589 nm, 20° C.] | 1.4846 |
| Δε [1 kHz, 20° C.] | 28.4 |
| $\epsilon_\perp$ [1 kHz, 20° C.] | 10.7 |

consisting of

| Compound | c/% by weight |
|---|---|
| UM-3-N | 4.0 |
| UM-5-N | 5.0 |
| PCH-3N.F.F | 7.0 |
| ME3N.F | 2.0 |
| ME4N.F | 8.0 |
| ME5N.F | 8.0 |
| D-302FF | 5.0 |
| D-502FF | 4.0 |
| CCP-302FF | 10.0 |
| CCP-502FF | 2.0 |
| HD-34 | 7.0 |
| HD-35 | 7.0 |
| DU-3-N | 5.0 |
| DU-5-N | 4.0 |
| CCPC-33 | 4.0 |
| CCPC-35 | 4.0 |
| CCZU-5-F | 7.0 |
| CCZU-2-F | 7.0 |
| Σ | 100.0 |

and has adequate contrast.

EXAMPLE 19

An IPS display contains a nematic mixture having

| | |
|---|---|
| clearing point | 80.0° C. |
| Δn [589 nm, 20° C.] | 0.1068 |
| $n_o$ [589 nm, 20° C.] | 1.4844 |
| Δε [1 kHz, 20° C.] | 26.1 |
| $\epsilon_\perp$ [1 kHz, 20° C.] | 10.2 |

consisting of

| Compound | c/% by weight |
|---|---|
| UM-3-N | 4.0 |
| UM-5-N | 4.0 |
| PCH-3N.F.F | 4.0 |
| ME3N.F | 2.0 |
| ME5N.F | 8.0 |
| D-302FF | 5.0 |
| D-502FF | 4.0 |
| CCP-302FF | 10.0 |
| CCP-502FF | 2.0 |
| HD-34 | 9.0 |
| HD-35 | 9.0 |
| DU-3-N | 4.0 |
| DU-5-N | 5.0 |
| CCPC-33 | 4.0 |
| CCPC-35 | 4.0 |
| CCZU-5-F | 7.0 |
| CCZU-2-F | 7.0 |
| PYP-4N.F.F | 4.0 |
| PYP-5N.F.F | 4.0 |
| Σ | 100.0 |

and has adequate contrast.

EXAMPLE 20

An IPS display contains a nematic mixture consisting of

| Compound | c/% by weight |
|---|---|
| UM-3-N | 5.0 |
| UM-5-N | 5.0 |
| PCH-3N.F.F | 10.0 |
| PCH-5N.F.F | 9.0 |
| ME3N.F | 4.0 |
| ME4N.F | 6.0 |
| ME5N.F | 5.0 |
| D-302FF | 5.0 |
| D-502FF | 4.0 |
| CCP-302FF | 7.0 |
| CCP-502FF | 3.0 |
| HD-34 | 7.0 |
| HD-35 | 7.0 |
| CCPC-33 | 5.0 |
| CCPC-35 | 4.0 |
| CCZU-5-F | 7.0 |
| CCZU-2-F | 5.0 |
| PDX-4 | 2.0 |
| Σ | 100.0 |

and has adequate contrast.

EXAMPLE 21

An IPS display contains a nematic mixture consisting of

| Compound | c/% by weight |
|---|---|
| CC-5-V | 8.0 |
| CC-3-V1 | 10.0 |
| CC-3-V | 10.0 |
| PCH-301 | 7.0 |
| PCH-2 | 12.0 |
| PGU-2-F | 5.0 |
| UM-3-N | 4.0 |
| CCP-20CF3 | 6.0 |
| CCP-30CF3 | 6.0 |
| CCP-V-1 | 16.0 |
| DU-3-N | 6.0 |
| BCH-32 | 8.0 |
| BCH-2F.F | 2.0 |
| Σ | 100.0 |

and has adequate contrast.

EXAMPLE 22

An IPS display contains a nematic mixture consisting of

| Compound | c/% by weight |
|---|---|
| CC-3-V | 19.0 |
| CC-3-V1 | 9.0 |
| CCH-35 | 4.0 |
| PCH-301 | 10.0 |
| PCH-2 | 5.0 |
| DU-3-N | 5.0 |
| PDX-3 | 5.0 |
| UM-3-N | 6.0 |
| CCP-V-1 | 16.0 |
| BCH-32 | 8.0 |
| BCH-52 | 8.0 |
| CCP-30CF3 | 5.0 |
| Σ | 100.0 |

and has adequate contrast.

EXAMPLE 23

An IPS display contains a nematic mixture having

| | |
|---|---|
| clearing point | 68.5° C. |
| Δn [589 nm, 20° C.] | 0.0984 |
| $n_o$ [589 nm, 20° C.] | 1.4914 |
| Δε [1 kHz, 20° C.] | 8.2 |
| $\epsilon_\perp$ [1 kHz, 20° C.] | 4.0 |
| $\gamma_1$ [20° C.] | 63 mPa.s |

consisting of

| Compound | c/% by weight |
|---|---|
| CC-3-V | 19.0 |
| CC-3-V1 | 9.0 |
| CCH-35 | 4.0 |
| PCH-301 | 10.0 |
| PCH-2 | 8.0 |
| PDX-3 | 5.0 |
| UM-3-N | 8.0 |
| CCP-V-1 | 16.0 |
| BCH-2F.F | 2.0 |
| BCH-32 | 8.0 |
| BCH-52 | 6.0 |
| CCP-30CF3 | 5.0 |
| Σ | 100.0 |

and has adequate contrast.

EXAMPLE 24

An IPS display contains a nematic mixture consisting of

| Compound | c/% by weight |
|---|---|
| CDU-2-F | 9.0 |
| CDU-3-F | 8.0 |
| CCP-2F.F.F | 3.0 |
| CCP-20CF3 | 7.0 |
| CCP-30CF3 | 5.0 |
| CP-30CF3 | 5.5 |
| CP-50CF3 | 5.0 |
| DU-3-N | 13.5 |
| UM-3-N | 4.5 |
| BCH-32 | 0.5 |
| CCZU-2-F | 4.0 |
| CCZU-3-F | 17.0 |
| CCZU-5-F | 4.0 |
| CC-3V-1 | 10.0 |
| CCH-35 | 4.0 |
| Σ | 100.0 |

and has adequate contrast.

EXAMPLE 25

An IPS display contains a nematic mixture consisting of

| Compound | c/% by weight |
|---|---|
| CDU-2-F | 9.0 |
| CDU-3-F | 8.0 |
| CCP-2F.F.F | 3.0 |
| CCP-20CF3 | 7.0 |
| CCP-30CF3 | 5.0 |
| CP-30CF3 | 5.5 |
| CP-50CF3 | 2.0 |
| DU-3-N | 12.0 |
| UM-3-N | 4.5 |
| BCH-32 | 3.0 |
| CCZU-2-F | 3.0 |
| CCZU-3-F | 17.0 |
| CC-5-V | 7.0 |
| CC-3V-1 | 10.0 |
| CCH-35 | 4.0 |
| Σ | 100.0 |

and has adequate contrast.

EXAMPLE 26

An IPS display contains a nematic mixture having

| | |
|---|---|
| clearing point | 67.5° C. |
| Δn [589 nm, 20° C.] | 0.0781 |
| $n_o$ [589 nm, 20° C.] | 1.4725 |
| Δε [1 kHz, 20° C.] | 15.5 |
| $\epsilon_\perp$ [1 kHz, 20° C.] | 5.8 |
| $\gamma_1$ [20° C.] | 104 mPa.s |
| $V_o$ [1 kHz, 20° C.] | 0.78 V |

consisting of

| Compound | c/% by weight |
|---|---|
| CDU-2-F | 9.0 |
| CDU-3-F | 8.0 |
| CCP-2F.F.F | 3.0 |
| CCP-20CF3 | 7.0 |
| CP-30CF3 | 6.0 |
| CP-50CF3 | 6.0 |
| PCH-3N.F.F | 6.5 |
| PDX-3 | 7.0 |
| UM-3-N | 6.0 |
| CCZU-2-F | 3.0 |
| CCZU-3-F | 17.0 |
| CC-5-V | 7.5 |
| CC-3V-1 | 10.0 |
| CCH-35 | 4.0 |
| Σ | 100.0 |

and has adequate contrast.

EXAMPLE 27

An IPS display contains a nematic mixture having

| | |
|---|---|
| clearing point | 71.0° C. |
| Δn [589 nm, 20° C.] | 0.0782 |
| $n_o$ [589 nm, 20° C.] | 1.4736 |
| Δε [1 kHz, 20° C.] | 16.5 |
| ε⊥ [1 kHz, 20° C.] | 6.4 |
| γ1 [20° C.] | 98 mPa · s |
| $V_o$ [1 kHz, 20° C.] | 0.74 V |

consisting of

| Compound | c/% by weight |
|---|---|
| CC-3-VI | 10.0 |
| CCH-35 | 5.0 |
| CC-5-V | 5.0 |
| CDU-2-F | 10.0 |
| CDU-3-F | 4.0 |
| CCP-30CF3 | 8.0 |
| CCP-40CF3 | 7.0 |
| DU-3-N | 15.0 |
| UM-3-N | 4.5 |
| CCZU-2-F | 5.0 |
| CCZU-3-F | 15.0 |
| CCP-V-1 | 8.5 |
| CP-30CF3 | 3.0 |
| Σ | 100.0 |

and has adequate contrast.

EXAMPLE 28

An IPS display contains a nematic mixture having

| | |
|---|---|
| clearing point | 70.5° C. |
| Δn [589 nm, 20° C.] | 0.0781 |
| $n_o$ [589 nm, 20° C.] | 1.4736 |
| Δε [1 kHz, 20° C.] | 18.4 |
| ε⊥ [1 kHz, 20° C.] | 6.7 |
| γ1 [20° C.] | 105 mPa · s |
| $V_o$ [1 kHz, 20° C.] | 0.71 V |

consisting of

| Compound | c/% by weight |
|---|---|
| CC-3-V1 | 10.0 |
| CCH-35 | 5.0 |
| CC-5-V | 2.5 |
| CDU-2-F | 10.0 |
| CDU-3-F | 6.0 |
| CCP-300F3 | 8.0 |
| CCP-400F3 | 6.0 |
| DU-3-N | 15.0 |
| UM-3-N | 4.5 |
| CCZU-2-F | 5.0 |
| CCZU-3-F | 15.0 |
| CCZU-5-F | 2.0 |
| COP-V-1 | 6.0 |
| CP-300F3 | 5.0 |
| Σ | 100.0 |

and has adequate contrast.

EXAMPLE 29

An IPS display contains a nematic mixture having

| | |
|---|---|
| clearing point | 72.0° C. |
| Δn [589 nm, 20° C.] | 0.0777 |
| $n_0$ [589 nm, 20° C.] | 1.4725 |
| Δε [1 kHz, 20° C.] | 13.4 |
| $\epsilon_\perp$ [1 kHz, 20° C.] | 5.3 |
| γ1 [20° C.] | 102 mPa · s |

consisting of

| Compound | c/% by weight |
|---|---|
| CDU-2-F | 9.0 |
| CDU-3-F | 8.0 |
| CCP-2F.F.F | 3.0 |
| CCP-20CF3 | 7.0 |
| CP-30CF3 | 6.0 |
| CP-50CF3 | 4.0 |
| PDX-3 | 6.0 |
| PDX-4 | 6.0 |
| UM-3-N | 5.0 |
| CCZU-2-F | 3.0 |
| CCZU-3-F | 17.0 |
| CC-5-V | 12.0 |
| CC-3V-1 | 10.0 |
| CCH-35 | 4.0 |
| Σ | 100.0 |

and has adequate contrast.

EXAMPLE 30

An IPS display contains a nematic mixture having

| | |
|---|---|
| clearing point | 71.5° C. |
| Δn [589 nm, 20° C.] | 0.0986 |
| $n_0$ [589 nm, 20° C.] | 1.4849 |
| Δε [1 kHz, 20° C.] | 12.8 |
| $\epsilon_\perp$ [1 kHz, 20° C.] | 4.8 |
| γ1 [20° C.] | 91 mPa · s |

consisting of

| Compound | c/% by weight |
|---|---|
| CC-5-V | 19.5 |
| CC-3-V1 | 10.5 |
| K9 | 3.0 |
| PDX-3 | 7.0 |
| PCH-3 | 15.0 |
| ME2N.F | 3.0 |
| UM-3-N | 4.0 |
| CCP-V-1 | 14.0 |
| CCZU-2-F | 4.0 |
| CCZU-3-F | 10.0 |
| CGZP-2-OT | 6.0 |
| CGZP-3-OT | 4.0 |
| Σ | 100.0 |

and has adequate contrast.

EXAMPLE 31

An IPS display contains a nematic mixture having

| | |
|---|---|
| clearing point | 80.5° C. |
| Δn [589 nm, 20° C.] | 0.0773 |
| $n_0$ [589 nm, 20° C.] | 1.4684 |
| Δε [1 kHz, 20° C.] | 13.5 |
| γ1 [20° C.] | 127 mPa · s |
| $\epsilon_\perp$ [1 kHz, 20° C.] | 5.5 |
| $V_o$ [1 kHz, 20° C.] | 0.84 V |

consisting of

| Compound | c/% by weight |
|---|---|
| CCP-2F.F.F | 3.0 |
| PCH-3N.F.F | 15.0 |
| CCZU-2-F | 7.0 |
| CCZU-3-F | 15.0 |
| CCZU-5-F | 7.0 |
| CCZG-2-OT | 10.0 |
| CCZG-3-OT | 10.0 |
| CCZG-5-OT | 10.0 |
| CC-3-V1 | 11.0 |
| CC-5-V | 9.0 |
| UM-3-N | 3.0 |
| Σ | 100.0 |

and has adequate contrast.

EXAMPLE 32

An IPS display contains a nematic mixture having

| | |
|---|---|
| Clearing point | 73.5° C. |
| Δn [589 nm, 20° C.] | 0.0725 |
| $n_o$ [589 nm, 20° C.] | 1.4675 |
| Δε [1 kHz, 20° C.] | 14.3 |
| $\epsilon_\perp$ [1 kHz, 20° C.] | 6.5 |
| $\gamma_1$ [20° C.] | 131 mPa·s |
| $V_o$ [1 kHz, 20° C.] | 0.77 V |

consisting of

| Compound | c/% by weight |
|---|---|
| CCP-2F.F.F | 3.0 |
| DU-3-N | 15.0 |
| CCZU-2-F | 7.0 |
| CCZU-3-F | 15.0 |
| CCZU-5-F | 7.0 |
| CCZG-2-OT | 10.0 |
| CCZG-3-OT | 10.0 |
| CCZG-5-OT | 10.0 |
| CC-3-V1 | 11.0 |
| CC-5-V | 9.0 |
| UM-3-N | 3.0 |
| Σ | 103.0 |

and has adequate contrast.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystal display comprising a realignment layer whose field has a component parallel to the liquid-crystal layer, said display also comprising a liquid-crystalline medium of positive dielectric anisotropy, wherein the medium comprises at least one compound of the formula I:

I

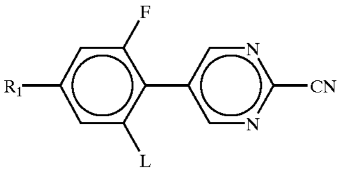

wherein $R^1$ is alkyl or alkoxy having 1 to 7 carbon atoms or alkenyl, alkenyloxy or alkoxyalkyl having 2 to 7 carbon atoms, and L is H or F.

2. A liquid-crystal display according to claim 1, wherein the medium further comprises at least one compound of the formula II:

II

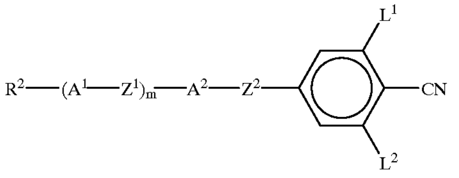

wherein $R^2$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, $A^1$ and $A^2$ are each, independently of one another, (a) trans-1,4-cyclohexylene or 1,4-cyclohexenylene wherein one or more non-adjacent $CH_2$ groups may be replaced by —O— and/or —S—, (b) 1,4-phenylene wherein one or two CH groups may be replaced by N, (c) 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where (a) and (b) may be substituted by one or two fluorine atoms, $Z^1$ and $Z^2$ are each, independently of one another, —CO—O—, —O—CO—, —$CH_2$O—, —$OCH_2$—, —$CH_2CH_2$—, —CH=CH—, —C≡C—, —CHF—CHF—, —CF=CF—, —$CF_2$O—, —$OCF_2$—, —$CF_2CF_2$— or a single bond, and one of $Z^1$ and $Z^2$ may alternatively be —$(CH_2)_4$— or —CH=CH—$CH_2CH_2$—, $L_1$ and $L_2$ are each, independently of one another, H or F; and m is 0, 1 or 2.

3. A liquid-crystal display according to claim 1 wherein the medium further comprises at least one compound of the formula III:

III

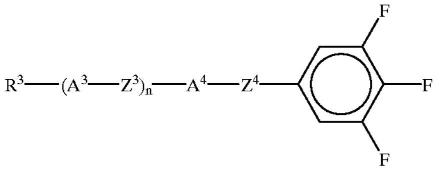

wherein $R^3$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, $A^3$ and $A^4$ are each, independently of one another, (a) trans-1,4-cyclohexylene or 1,4-cyclohexenylene wherein one or more non-adjacent $CH_2$ groups may be replaced by —O— and/or —S—, (b) 1,4-phenylene wherein one or two CH groups may be replaced by N, (c) 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where (a) and (b) may be substituted by one or two fluorine atoms, $Z^3$ and $Z^4$ are each, independently of one another, —CO—O—, —O—CO—, —$CH_2$O—, —$OCH_2$—, —$CH_2CH_2$—, —CH=CH—, —C≡C—, —CHF—CHF—, —CF=CF—, —$CF_2$O—, —$OCF_2$—, —$CF_2CF_2$— or a single bond, and one of $Z^3$ and $Z^4$ may alternatively be —$(CH_2)_4$— or —CH=CH—$CH_2CH_2$—, and n is 0, 1 or 2.

4. A liquid-crystal display according to claim 1 wherein the medium further comprises at least one compound of the formula IV:

$$R^4—(A^5—Z^5)_o—A^6—R^5 \qquad IV$$

wherein $R^4$ and $R^5$ each, independently of one another, are H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, $A^5$ and $A^6$ are each, independently of one another, (a) trans-1,4-cyclohexylene or 1,4-cyclohexenylene wherein one or more non-adjacent $CH_2$ groups may be replaced by —O— and for —S—, (b) 1,4-phenylene wherein one or two CH groups may be replaced by N, (c) 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where (a) and (b) may be substituted by one or two fluorine atoms, each $Z^5$, is independently of one another, —CO—O—, —O—CO—, —$CH_2O$—, —$OCH_2$—, —$CH_2CH_2$—, —CH=CH—, —C≡C—, —CHF—CHF—, —CF=CF—, —$CF_2O$—, —$OCF_2$—, —$CF_2CF_2$— or a single bond, and $Z^5$ may alternatively be —$(CH_2)_4$— or —CH=CH—$CH_2CH_2$—, and o is 1, 2 or 3.

5. A liquid-crystal display according to claim 1 wherein the medium further comprises at least one compound of the formula V:

V

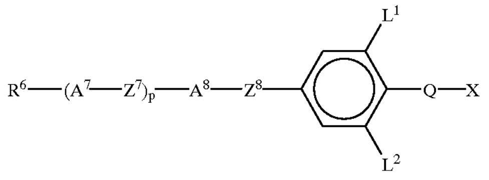

wherein $R^6$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, $A^7$ and $A^8$ are each, independently of one another, (a) trans-1,4-cyclohexylene or 1,4-cyclohexenylene wherein one or more non-adjacent $CH_2$ groups may be replaced by —O— and/or —S—, (b) 1,4-phenylene wherein one or two CH groups may be replaced by N, (c) 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where (a) and (b) may be substituted by one or two fluorine atoms, $Z^7$ and $Z^8$ are each, independently of one another, —CO—O—, —O—CO—, —$CH_2O$—, —$OCH_2$—, —$CH_2CH_2$—, —CH=CH—, —C≡C—, —CHF—CHF—, —CF=CF—, —$CF_2O$—, —$OCF_2$—, —$CF_2CF_2$— or a single bond, and one of $Z^7$ and $Z^8$ may alternatively be —$(CH_2)_4$— or —CH=CH—$CH_2CH_2$—, $L^1$ and $L^2$ are each, independently of one another, H or F, Q is polyfluoroalkylene of the formula:

$$—(O)_q—(CH_2)_r—(CF_2)_s—,$$

in which q is 0 or 1, r is 0, 1, 2, 3, 4, 5 or 6, and s is 1, 2, 3, 4, 5 or 6,

X is H, F or Cl, and p is 0, 1 or 2.

6. A liquid-crystal display according to claim 1 wherein the medium further comprises at least one compound of the formula VI:

VI

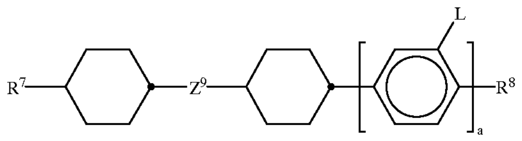

wherein $R^7$ is an alkenyl group having 2 to 7 carbon atoms, $Z^9$ is —CH=CH— or a single bond, L is H or F, a is 0 or 1, and $R^8$ is an alkyl, alkoxy or alkenyl group having 1 to 12 carbon atoms, in which, in addition, one or two non-adjacent $CH_2$ groups may be replaced by —O—, —CH=CH—, —CO—, —OCO— or —COO— in such a way that O atoms are not linked directly to one another, or, if a is 1, is alternatively F.

7. A liquid-crystal display according to claim 1 wherein the medium comprises from 2–40%, by weight of at least one compound of the formula I:

I

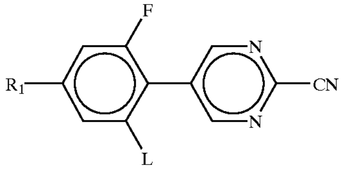

wherein $R^1$ is alkyl or alkoxy having 1 to 7 carbon atoms or alkenyl, alkenyloxy or alkoxyalkyl having 2 to 7 carbon atoms, and L is H or F, from 15–85%, by weight of at least one compound of the formulae II or III, from 0–75%, by weight of at least compound of the formula II, from 0–55%, by weight of at least one compound of the formula III:

II

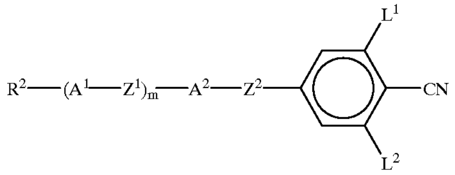

wherein $R^1$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, $A^1$ and $A^2$ are each, independently of one another, (a) trans-1,4-cyclohexylene or 1,4-cyclohexenylene wherein one or more non-adjacent $CH_2$ groups may be replaced by —O— and/or —S—, (b) 1,4-phenylene wherein one or two CH groups may be replaced by N, (c) 1,4-bicyclo[2.2.2]octylene, piperidine- 1,4-diyl, naphthalene-2,6-diyl, decahydronaphthalene-2,6-diyl or 1,2,3,4-tetrahydronaphthalene- 2,6-diyl, where (a) and (b) may be substituted by one or two fluorine atoms, $Z^1$ and $Z^2$ are each, independently of one another, —CO—O—, —O—CO—, —$CH_2O$—, —$OCH_2$—, —$CH_2CH_2$—, —CH═CH—, —C≡C—, —CHF—CHF—, —CF═CF—, —$CF_2O$—, —$OCF_2$—, —$CF_2CF_2$— or a single bond, and one of $Z^1$ and $Z_2$ may alternatively be —$(CH_2)_4$—or —CH═CH—$CH_2CH_2$—, $L_1$ and $L_2$ are each, independently of one another, H or F; and m is 0, 1 or 2;

III

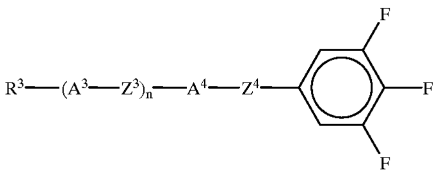

wherein $R^3$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S— , —CO—, —CO—O—, —O—CO— or —O—CO—O— in such a way that O atoms are not linked directly to one another, $A^3$ and $A^4$ are each, independently of one another, (a) trans-1,4-cyclohexylene or 1,4-cyclohexenylene wherein one or more non-adjacent $CH_2$ groups may be replaced by —O—and/or —S—, (b) 1,4-phenylene wherein one or two CH groups may be replaced by N, (c) 1,4-bicyclo[2.2.2]octylene piperidine-1,4-diyl, naphthalene-2,6diyl, decahydronaphthalene-2,6-diyl or 1,2,3,4-tetrahydronaphthalene-2,6-diyl, where (a) and (b) may be substituted by one or two fluorine atoms, $Z^3$ and $Z^4$ are each, independently of one another, —CO—O—, —O—CO—, —$CH_2O$—, —$OCH_2$—, —$CH_2CH_2$—, —CH═CH—, —C≡C—, —CHF—CHF—, —CF═CF—, —$CF_2O$—, —$OCF_2$—, —$CF_2CF_2$—or a single bond, and one of $Z^3$ and $Z^4$ may alternatively be —$(CH_2)_4$— or —CH═CH—$CH_2CH_2$, and n is 0,1 or 2;

from 0–60%, by weight of at least one compound of the formula IV:

$R^4$—$(A^5$—$Z^5)_o$—$A^6$—$R^5$ IV wherein $R^4$ and $R^5$ each, independently of one another, are H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S— , —CO—, —CO—O—, —O—CO— or —O—CO—O— in such a way that O atoms are not linked directly to one another, $A^5$ and $A^6$ are each, independently of one another, (a) trans-1,4-cyclohexylene or 1,4-cyclohexenylene wherein one or more (b) 1,4-phenylene wherein one or two CH groups may be replaced by N, (c)1,4-bicyclo[2.2.2]octylene piperidine-1,4-diyl, naphthalene-2,6-diyl, decahydronaphthalene-2,6-diyl or 1,2,3,4-tetrahydronaphthalene-2,6-diyl, where (a) and (b) may be substituted by one or two fluorine atoms, each $Z^5$, is independently of one another, —CO—O—, —O—CO—, —$CH_2O$—, —$OCH_2$—, —$CH_2CH_2$—, —CH═CH—, —C≡C—, —CHF—CHF—, —CF═CF—, —$CF_2O$—, —$OCF_2$—, —$CF_2CF_2$— or a single bond, and $Z^5$ may alternatively be —$(CH_2)_4$— or —CH═CH—$CH_2CH_2$, and o is 1, 2 or 3;

from 0–40%, by weight of at least one compound of the formula V:

V

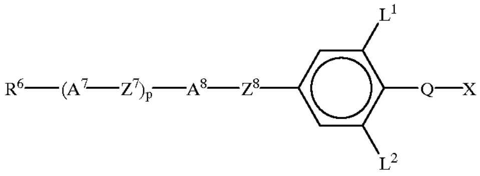

wherein $R^6$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, $A^7$ and $A^8$ are each, independently of one another, (a) trans-1,4-cyclohexylene or 1,4-cyclohexenylene wherein one or more non-adjacent $CH_2$ groups may be replaced by —O—and/or —S— , (b) 1,4-phenylene wherein one or two CH groups may be replaced by N, (c) 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where (a) and (b) may be substituted by one or two fluorine atoms, $Z^7$ and $Z^8$ are each, independently of one another, —CO—O—, —O—CO—, —$CH_2O$—, —$OCH_2$—, —$CH_2CH_2$—, —CH═CH—, —C≡C—, —CHF—CHF—, —CF═CF—, —$CF_2O$—, —$OCF_2$—, —$CF_2CF_2$— or a single bond, and one of $Z^7$ and $Z^8$ may alternatively be —$(CH_2)_4$—or —CH═CH—$CH_2CH_2$—, $L^1$ and $L^2$ are each, independently of one another, H or F, Q is polyfluoroalkylene of the formula:

$-(O)_q-(CH_2)_r-(CF_2)_s-$, in which q is 0 or 1, r is 0, 1, 2, 3, 4, 5 or 6, and s is 1, 2, 3, 4, 5 or 6, X is H, F or Cl, and p is 0, 1, or 2; and from 0–55%, by weight of at least one compound of the formula VI:

VI

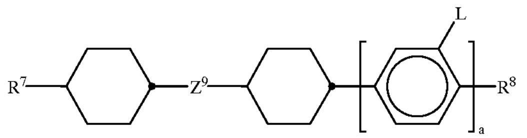

wherein $R^7$ is an alkenyl group having 2 to 7 carbon atoms, $Z^9$ is —CH═CH— or a single bond, L is H or F, a is 0 or 1, and $R^8$ is an alkyl, alkoxy or alkenyl group having 1 to 12 carbon atoms, in which, in addition, one or two non-adjacent $CH_2$ groups may be replaced by —O—, —CH═CH—, —CO—, —OCO— or —COO—in such a way that O atoms are not linked directly to one another, or, if a is 1, is alternatively F.

8. A liquid-crystal display according to claim 1 wherein an active matrix addresses the pixels.

9. A liquid-crystal display according to claim 7 wherein the medium comprises from 3–30%, by weight of at least one compound of the formula I, from 20–65%, by weight of at least one compound of the formulae II or III, from 10–67%, by weight of at least one compound of the formula II, from 5–50%, by weight of at least one compound of the formula III, from 5–45%, by weight of at least one compound of the formula IV, from 5–35%, by weight of at least one compound of the formula V, and from 5–45%, by weight of at least one compound of the formula VI.

10. A liquid-crystal display according to claim 7 wherein the medium comprises from 3–22%, by weight of at least one compound of the formula I, from 20–65%, by weight of at least one compound of the formulae II or III, from 15–40%, by weight of at least one compound of the formula II, from 10–40%, by weight of at least one compound of the formula III, from 5–45%, by weight of at least one compound of the formula IV, from 10–25%, by weight of at least one compound of the formula V, and from 5–45%, by weight of at least one compound of the formula VI.

11. A liquid crystal display according to claim 1 wherein L is F and $R^1$ is alkyl or alkoxy having 1 to 7 carbon atoms.

12. A liquid crystal display according to claim 1 further comprising at least one of the following compounds:

IIa

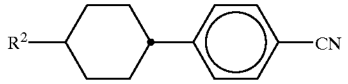

IIb

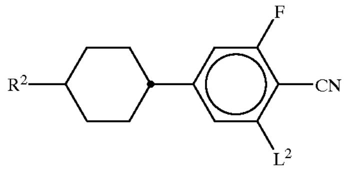

IIc

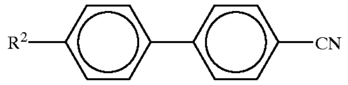

IId

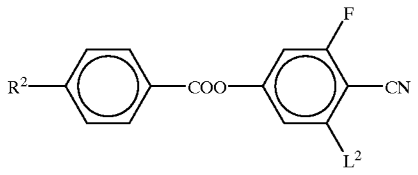

IIh

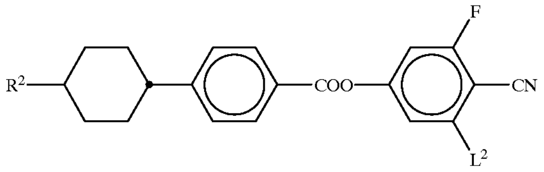

IIk

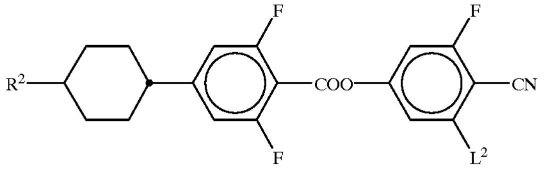

wherein $R_2$ is H, alkyl or alkenyl having 1 to 15 carbon atoms which unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, and $L^2$ is H or F.

13. A liquid crystal display according to claim 1:

further comprising at least one of the following compounds:

IIIc

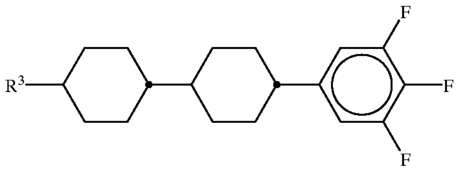

IIId

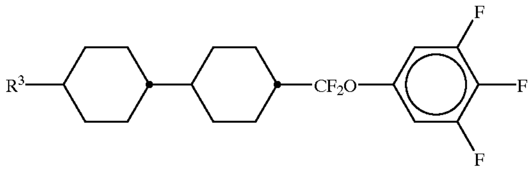

IIIe

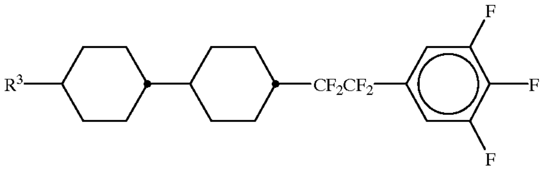

IIIf

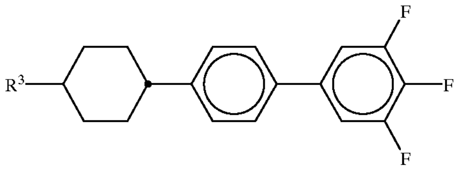

IIIg

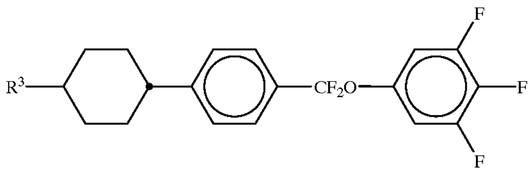

IIIh

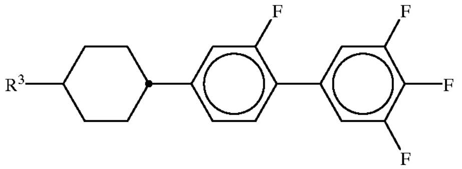

IIIi

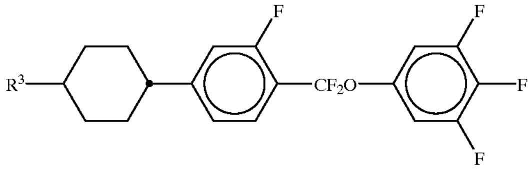

wherein $R^3$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another.

14. A liquid crystal display according to claim 1 further comprising at least one of the following compounds;

IVb

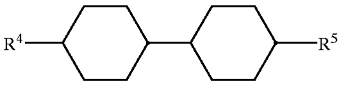

IVe

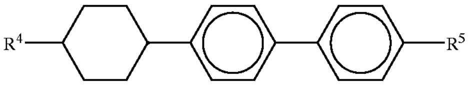

IVk

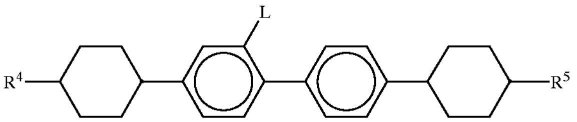

or

IVm

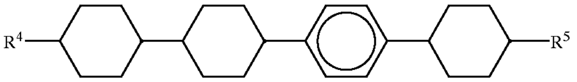

wherein $R^4$ and $R^5$, are each, independently of one another, H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another.

15. A liquid crystal display according to claim 1 further comprising at least one of the following compounds;

Va

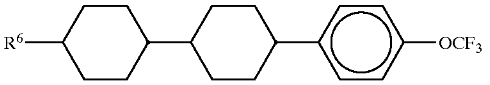

Vc

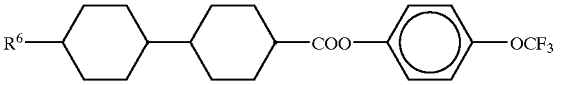

Vd

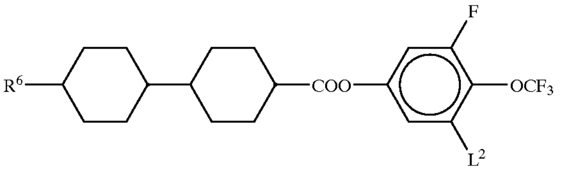

Ve

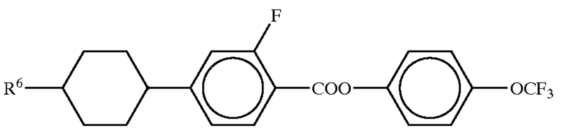

or

Vf

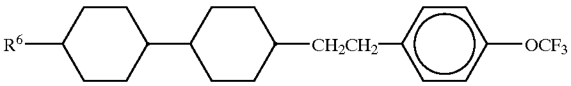

wherein $R^6$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, and $L^2$ is H or F.

16. A liquid crystal display according to claim 1, wherein the liquid crystalline medium has a flow viscosity generally less than 30 $mm^2s^{-1}$ at 20° C.

17. A liquid crystal display according to claim 1, wherein the liquid crystalline medium has a rotational viscosity generally less than 140 mPa·s at 20° C.

18. A medium comprising at least one compound of the formula I:

I

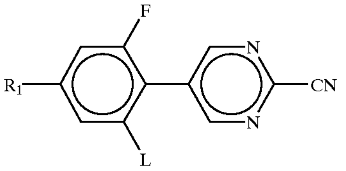

wherein $R^1$ is alkyl or alkoxy having 1 to 7 carbon atoms or alkenyl, alkenyloxy or alkoxyalkyl having 2 to 7 carbon atoms, and L is H or F; and at least one compound of the formula II:

II

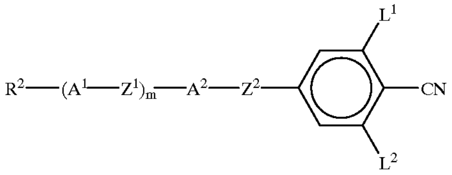

wherein $R^2$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, $A^1$ and $A^2$ are each, independently of one another, (a) trans-1,4-cyclohexylene or 1,4-cyclohexenylene wherein one or more non-adjacent $CH_2$ groups may be replaced by —O— and/or —S—, (b) 1,4-phenylene wherein one or two CH groups may be replaced by N, (c) 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where (a) and (b) may be substituted by one or two fluorine atoms, $Z^1$ and $Z^2$ are each, independently of one another, —CO—O—, —O—CO—, —$CH_2$O—, —O$CH_2$—, —$CH_2CH_2$—, —CH═CH—, —C≡C—, —CHF—CHF—, —CF═CF—, —$CF_2$O—, —O$CF_2$—, —$CF_2CF_2$— or a single bond, and one of $Z^1$ and $Z^2$ may alternatively be —$(CH_2)_4$— or —CH═CH—$CH_2CH_2$—, $L_1$ and $L_2$ are each, independently of one another, H or F; and m is 0, 1 or 2.

19. A medium according to claim 18 further comprising at least one compound of the formula III:

III

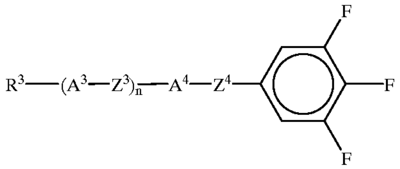

wherein $R^3$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, $A^3$ and $A^4$ are each, independently of one another, (a) trans-1,4-cyclohexylene or 1,4-cyclohexenylene wherein one or more non-adjacent $CH_2$ groups may be replaced by —O— and/or —S—, (b) 1,4-phenylene wherein one or two CH groups may be replaced by N, (c) 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where (a) and (b) may be substituted by one or two fluorine atoms, $Z^3$ and $Z^4$ are each, independently of one another, —CO—O—, —O—CO—, —$CH_2$O—, —O$CH_2$—, —$CH_2CH_2$—, —CH═CH—, —C≡C—, —CHF—CHF—, —CF═CF—, —$CF_2$O—, —O$CF_2$—, —$CF_2CF_2$— or a single bond, and one of $Z^3$ and $Z^4$ may alternatively be —$(CH_2)_4$— or —CH═CH—$CH_2CH_2$—, and n is 0, 1 or 2.

20. A medium according to claim 18 further comprising at least one compound of the formula IV:

$$R^4—(A^5—Z^5)_o—A^6—R^5 \qquad IV$$

wherein $R^4$ and $R^5$ each, independently of one another, are H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, $A^5$ and $A^6$ are each, independently of one another, (a) trans-1,4-cyclohexylene or 1,4-cyclohexenylene wherein one or more non-adjacent $CH_2$ groups may be replaced by —O— and/or —S—, (b) 1,4-phenylene wherein one or two CH groups may be replaced by N, (c) 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where (a) and (b) may be substituted by one or two fluorine atoms, each $Z^5$, is independently of one another, —CO—O—, —O—CO—, $—CH_2O—$, $—OCH_2—$, $—CH_2CH_2—$, —CH=CH—, —C≡C—, —CHF—CHF—, —CF=CF—, $—CF_2O—$, $—OCF_2—$, $—CF_2CF_2—$ or a single bond, and $Z^5$ may alternatively be $—(CH_2)_4—$ or $—CH=CH—CH_2CH_2—$, and o is 1, 2 or 3.

21. A medium according to claim 18 further comprising at least one compound of the formula V:

V

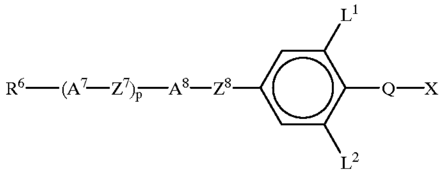

in which $R^6$ is H, alkyl or alkenyl having 1 to 15 carbon atoms which is unsubstituted, monosubstituted by CN or $CF_3$ or at least monosubstituted by halogen, where one or more $CH_2$ groups may also each, independently of one another, be replaced by —O—, —S—, —CO—, —CO—O—, —O—CO— or —O—CO—O— in such a way that O atoms are not linked directly to one another, $A^7$ and $A^8$ are each, independently of one another, (a) trans-1,4-cyclohexylene or 1,4-cyclohexenylene wherein one or more non-adjacent $CH_2$ groups may be replaced by —O— and/or —S—, (b) 1,4-phenylene wherein one or two CH groups may be replaced by N, (c) 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where (a) and (b) may be substituted by one or two fluorine atoms, $Z^7$ and $Z^8$ are each, independently of one another, —CO—O—, —O—CO—, $—CH_2O—$, $—OCH_2—$, $—CH_2CH_2—$, —CH=CH—, —C≡C—, —CHF—CHF—, —CF=CF—, $—CF_2O—$, $—OCF_2—$, $—CF_2CF_2—$ or a single bond, and one of $Z^7$ and $Z^8$ may alternatively be $—(CH_2)_4—$ or $—CH=CH—CH_2CH_2—$, $L^1$ and $L^2$ are each, independently of one another, H or F, Q is polyfluoroalkylene of the formula:

$$—(O)_q—(CH_2)_r—(CF_2)_s—,$$

in which q is 0 or 1, r is 0, 1, 2, 3, 4, 5 or 6, and s is 1, 2, 3, 4, 5 or 6,

X is H, F or Cl, and p is 0, 1 or 2.

22. A medium according to claim 18 further comprising at least one compound of the formula VI:

VI

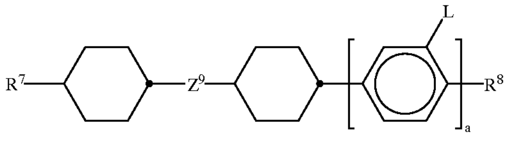

wherein $R^7$ is an alkenyl group having 2 to 7 carbon atoms, $Z^9$ is —CH=CH— or a single bond, L is H or F, a is 0 or 1, and $R^8$ is an alkyl, alkoxy or alkenyl group having 1 to 12 carbon atoms, in which, in addition, one or two non-adjacent $CH_2$ groups may be replaced by —O—, —CH=CH—, —CO—, —OCO— or —COO— in such a way that O atoms are not linked directly to one another, or, if a is 1, is alternatively F.

23. A liquid-crystalline medium of positive dielectric anisotropy comprising a composition of the formula I:

I

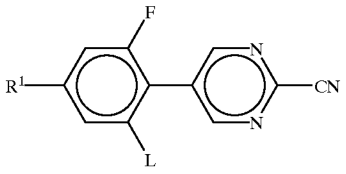

wherein $R^1$ is an alkyl or alkoxy having 1 to 7 carbon atoms or alkenyl, alkenyloxy or alkoxyalkyl having 2 to 7 carbon atoms, and L is H or F.

* * * * *

UNITED STATES PATENT AND TRADEMARK OFFICE

CERTIFICATE OF CORRECTION

PATENT NO. : 6,582,782 B2
DATED : June 24, 2003
INVENTOR(S) : Michael Heckmeier et al.

It is certified that error appears in the above-identified patent and that said Letters Patent is hereby corrected as shown below:

Column 42,
Line 65, reads "and for" should read -- and/or --

Column 46,
Line 13, reads "or more" should read -- or more non-adjacent $CH_2$ groups may be replaced by -O- and/or -S-, --

Signed and Sealed this

Seventeenth Day of August, 2004

JON W. DUDAS
*Acting Director of the United States Patent and Trademark Office*